United States Patent
Liu et al.

(10) Patent No.: US 12,521,936 B2
(45) Date of Patent: Jan. 13, 2026

(54) ACRYLIC COMPOSITION FOR 3-D PRINTING

(71) Applicant: Arkema France, Colombes (FR)

(72) Inventors: David Shen-Ren Liu, Bala Cynwyd, PA (US); Mary K. Calvin, Havertown, PA (US); Robert J. Barsotti, Newtown Square, PA (US); Jing-Han Wang, King of Prussia, PA (US)

(73) Assignee: ARKEMA FRANCE, Puteaux (FR)

( * ) Notice: Subject to any disclaimer, the term of this patent is extended or adjusted under 35 U.S.C. 154(b) by 278 days.

(21) Appl. No.: 17/599,709

(22) PCT Filed: Mar. 27, 2020

(86) PCT No.: PCT/US2020/025343
§ 371 (c)(1),
(2) Date: Sep. 29, 2021

(87) PCT Pub. No.: WO2020/205565
PCT Pub. Date: Oct. 8, 2020

(65) Prior Publication Data
US 2022/0193983 A1    Jun. 23, 2022

Related U.S. Application Data

(60) Provisional application No. 62/826,099, filed on Mar. 29, 2019.

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/245* (2017.08);
(Continued)

(58) Field of Classification Search
CPC ... B29C 64/118; B29C 64/314; B29C 64/245; B29C 64/209; B33Y 10/00; B33Y 70/00;
(Continued)

(56) References Cited

U.S. PATENT DOCUMENTS

| 4,455,331 A * | 6/1984 | Barsotti | C09D 175/00 427/393 |
| 8,835,544 B2 * | 9/2014 | Mehlmann | C08L 51/003 524/523 |

(Continued)

FOREIGN PATENT DOCUMENTS

| CN | 105524399 A | 4/2016 |
| WO | 2017210286 A1 | 12/2017 |

OTHER PUBLICATIONS

International Search Report (PCT/ISA/210) and Written Opinion (PCT/ISA/237) mailed on Jun. 23, 2020, by the U.S. Patent and Trademark Office as the International Searching Authority for International Application No. PCT/US2020/025343. (8 pages).

(Continued)

*Primary Examiner* — Christina A Johnson
*Assistant Examiner* — Xue H Liu
(74) *Attorney, Agent, or Firm* — BUCHANAN INGERSOLL & ROONEY PC

(57) ABSTRACT

The invention relates to an acrylic copolymer composition useful for 3-D printing, that can be formed into a uniform filament and 3-D printed using material extrusion additive manufacturing, into an article having low warpage, low shrinkage, good internal optical properties, and good mechanical properties. The acrylic copolymer has a low Tg, providing the proper stiffness for good 3-D printing. The invention also relates to the printing and processing of the acrylic composition where internally transparent 3-D printed thermoplastic parts can be produced at a reasonable rate (Continued)

(>0.05 mm per layer) with good/great layer adhesion, and near isotropic properties.

21 Claims, 8 Drawing Sheets

(51) Int. Cl.
| | |
|---|---|
| B29C 64/245 | (2017.01) |
| B29C 64/314 | (2017.01) |
| B33Y 10/00 | (2015.01) |
| B33Y 70/00 | (2020.01) |
| C08F 220/18 | (2006.01) |
| C08L 33/08 | (2006.01) |
| B29K 33/00 | (2006.01) |
| B33Y 40/00 | (2020.01) |
| B33Y 80/00 | (2015.01) |

(52) U.S. Cl.
CPC .......... *B29C 64/314* (2017.08); *B33Y 10/00* (2014.12); *B33Y 70/00* (2014.12); *C08F 220/1802* (2020.02); *C08L 33/08* (2013.01); *B29K 2033/12* (2013.01); *B29K 2995/0026* (2013.01); *B33Y 40/00* (2014.12); *B33Y 80/00* (2014.12); *C08L 2205/02* (2013.01); *C08L 2205/03* (2013.01); *C08L 2205/22* (2013.01); *C08L 2207/53* (2013.01)

(58) Field of Classification Search
CPC .... B33Y 40/00; B33Y 80/00; B29K 2033/12; B29K 2995/0026
USPC ......................................................... 264/308
See application file for complete search history.

(56) References Cited

U.S. PATENT DOCUMENTS

| | | |
|---|---|---|
| 2015/0218362 A1 | 8/2015 | Gerard et al. |
| 2016/0009878 A1 | 1/2016 | Gerard |
| 2020/0354560 A1 | 11/2020 | Wang et al. |
| 2024/0061149 A1* | 2/2024 | Wang ..................... C08L 33/12 |

OTHER PUBLICATIONS

Wikipedia Article, "Plasticizer", published online Mar. 24, 2019, pp. 1-8, https://en.wikipedia.org/w/index.php?title=Plasticizer&oldid=889280990.

* cited by examiner

Dual extruded letter "A"

FIGURE 12
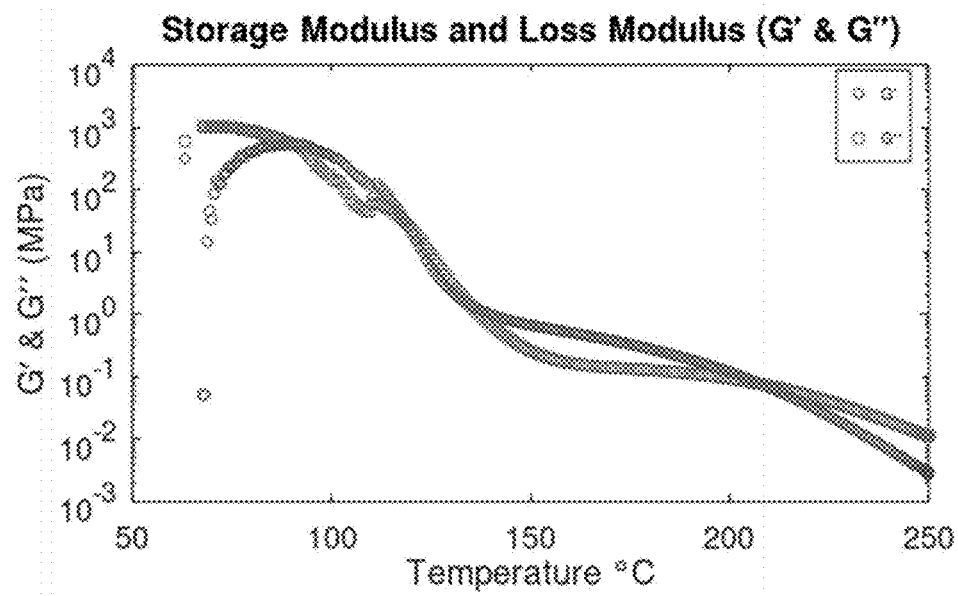
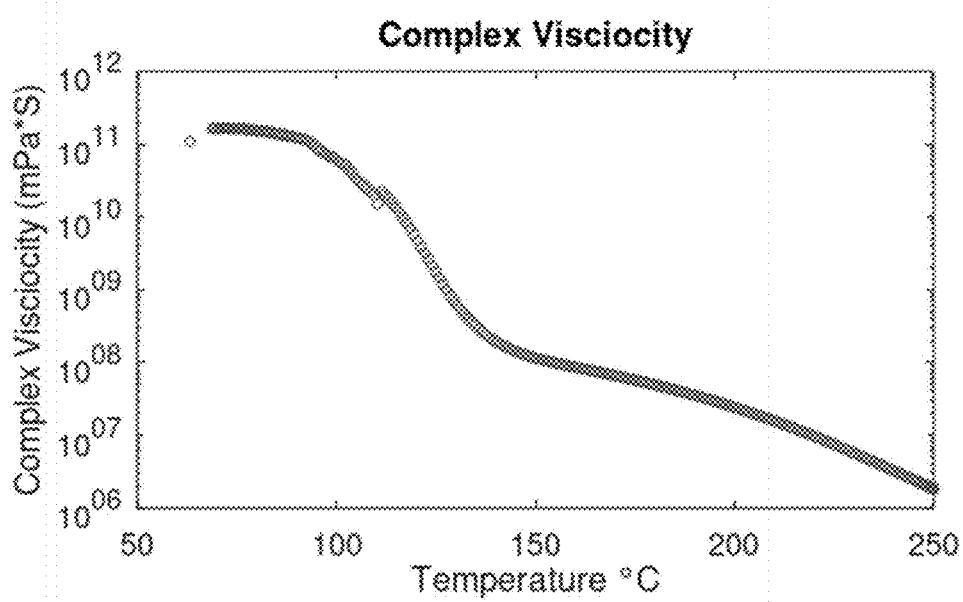
FIGURE 13

FIGURE 14
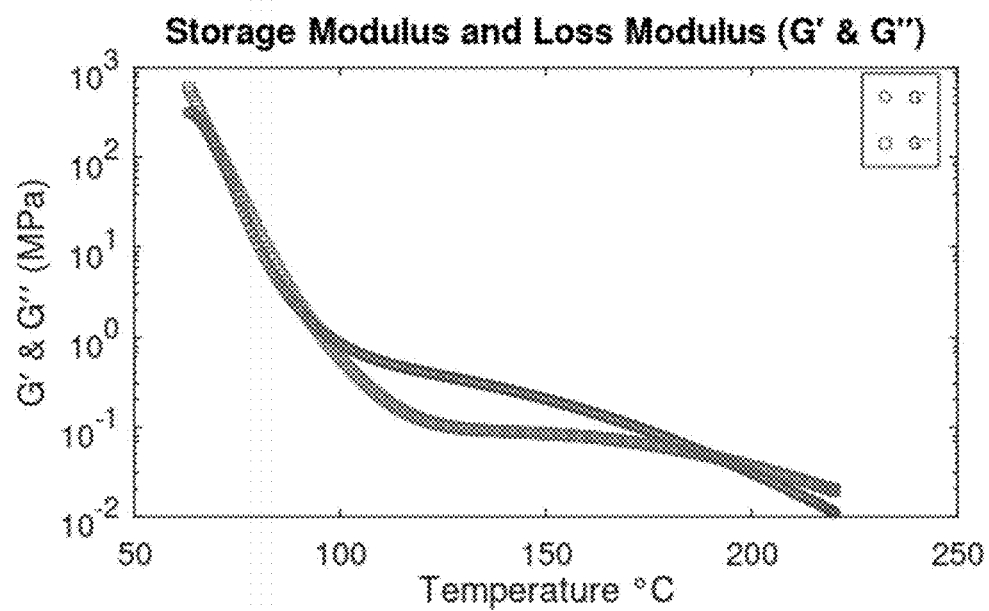
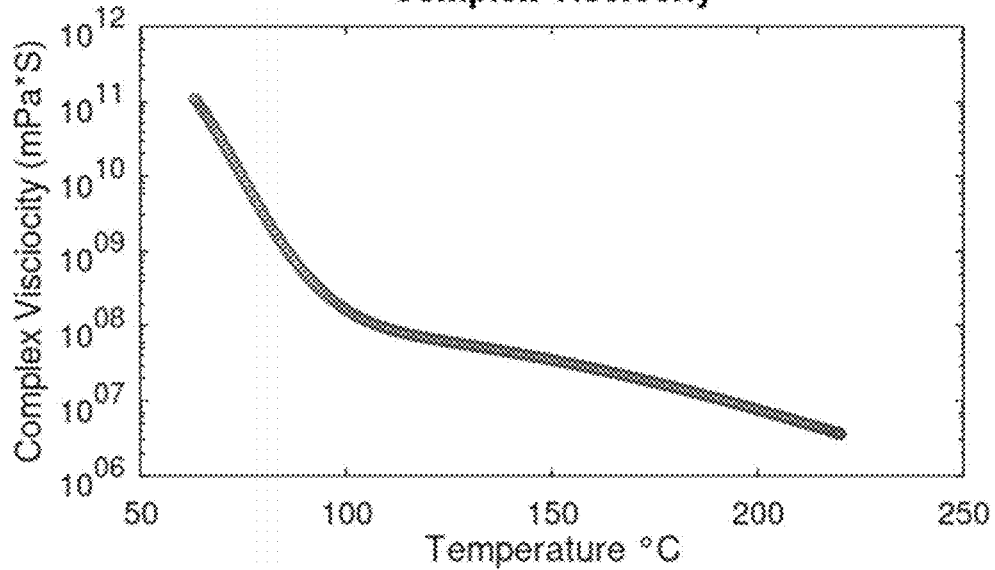
FIGURE 15

FIGURE 16
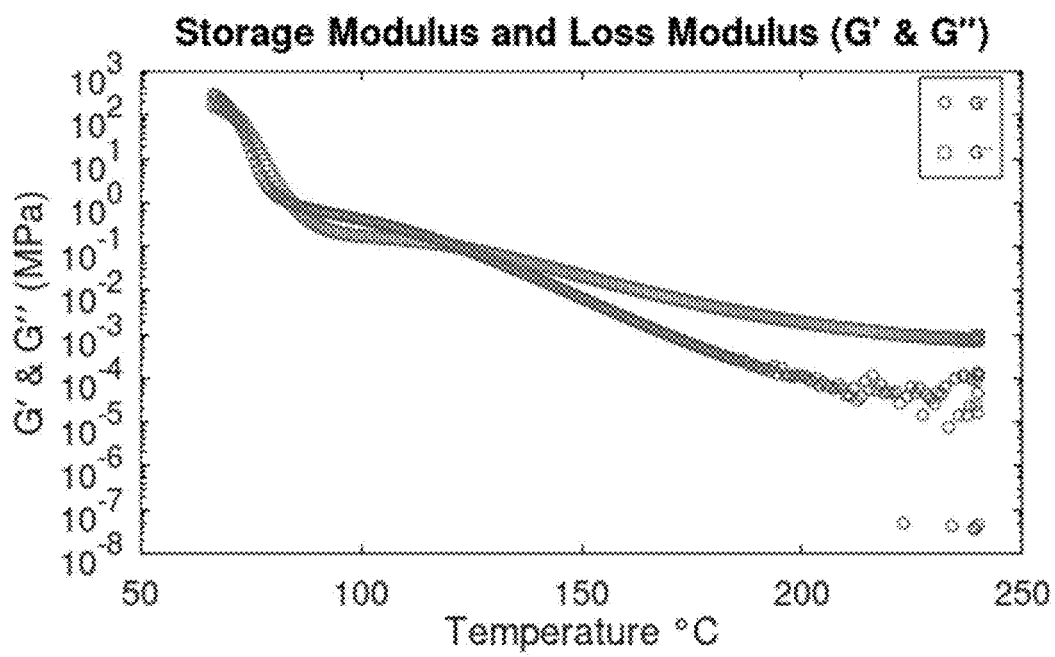
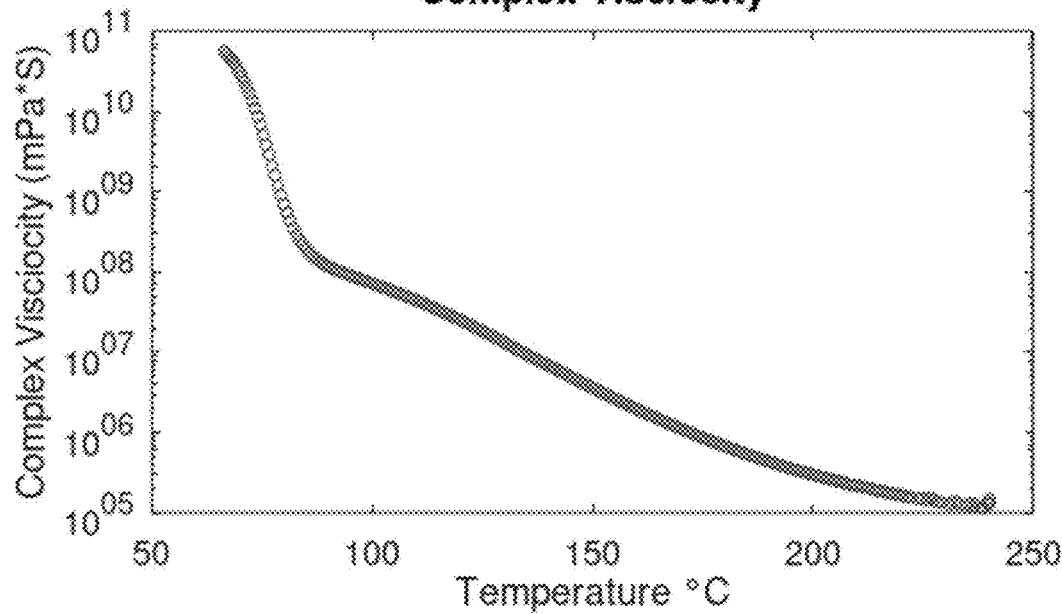
FIGURE 17

ACRYLIC COMPOSITION FOR 3-D PRINTING

FIELD OF THE INVENTION

The invention relates to an acrylic copolymer composition useful for 3-D printing, that can be formed into a uniform filament and material extrusion printed using material extrusion additive manufacturing, into an article having low warpage, low shrinkage, good internal optical properties, and good mechanical properties. The acrylic copolymer composition can also be used for other 3D printing techniques, such as pellet extrusion. The acrylic copolymer has certain rheological features for good 3-D printing.

A second aspect of the invention is the printing and processing of the acrylic composition where internally transparent 3-D printed thermoplastic parts can be produced at a reasonable layer height (>0.01 mm per layer) with good/ great layer adhesion, and near isotropic properties. Internal haze rating of <10% was achieved even at 0.4 mm per layer.

BACKGROUND OF THE INVENTION

Equipment advances and reduction in pricing have allowed 3-D printing to become widely adopted in homes, schools, and industry as a fast, simple, and often cheaper way to prototype and make custom end use parts. Specifically, material extrusion additive manufacturing 3-D printing (also known as fused filament fabrication or fused deposition modeling), has emerged as a tool of choice for direct consumer use, larger scale production, and quick thermoplastic prototyping, as it is the easiest to operate and it produces the least waste and shortest turnaround time of the 3-D printing technologies.

Many materials have been used to produce 3-D printed articles for a wide variety of end uses, from chocolate to collagen. Thermoplastic materials are especially well adapted for use with material additive extrusion printers. Unfortunately, there have been few thermoplastics available that provide good mechanical properties, transparency, and ease of print.

Polylactic acid (PLA) is widely used for desktop home printers as it prints well, and has very low warpage. Unfortunately, it has a low use temperature and poor chemical stability, and it yellows (degrades) during printing when not colored with dyes or pigments. Acrylonitrile butadiene styrene (ABS) is a more stable commonly used "engineering" thermoplastic for 3-D printing, and has a higher use temperature—but it exhibits higher warpage during printing, is not transparent, and has a printed elongation at break of less than 6%. Polyethylene terephthalate glycol (PETG) and other copolyesters have been a very popular addition to the 3-D printing space with its higher use temp and stability like ABS, and improved printability—but it has a higher processing temperature, is softer, and some discoloration in the resin.

Acrylic polymers are well known for their clarity, sparkling color, surface gloss, depth of image, and weather resistance. They have similar use temperatures to ABS. Unfortunately, the brittleness associated with acrylic polymers makes them impractical for making filaments for use in extrusion additive 3-D printing.

There is a desire to have the physical weathering resistance, transparency, and appearance of an acrylic polymer in a material extrusion additive printed article, with low warpage and no need for an adhesive or heated chamber, as with PLA, yet having the mechanical and chemical properties of ABS, and additionally having good impact resistance, and excellent optical clarity.

WO 2017/210,286 describes a dimensionally stable acrylic alloy for 3-D printing, the alloy containing an acrylic polymer and a compatible, low melt viscosity polymer. The acrylic polymers can have a wide range of composition, the reference being silent on the Tg of the acrylic polymer.

Surprisingly, it has now been found that compositions containing a low Tg composition of less than 160° C., preferably less than 150° C., preferably less than 140° C., preferably less than 130° C., preferably less than 120° C., preferably less than 114° C., preferably less than 100° C., preferably less than 90° C., preferably less than 85° C., preferably less than 80° C., and more preferably less than 75° C. provides an acrylic 3-D printable filament that is dimensionally stable, and has the flexibility and flow properties to be printed, while retaining the transparency and strength of PMMA. The lower-Tg acrylic composition may be an acrylic copolymer; a blend of acrylic polymers with a non-polymeric, Tg-lowering additive, such as a plasticizer, or a blend of an acrylic polymer with a compatible low viscosity polymer. The low Tg acrylic polymer has physical and print properties similar to the acrylic alloys described in the prior art, but with improved clarity due to the lack of the low viscosity polymer.

The ability to 3D print transparent parts with thermoplastics has been a goal of the 3D printing community for a long time. However, despite using transparent materials, the act of the material extrusion style 3D printing typically adds numerous layer and line interfaces that then make the printed part hazy and not transparent. Layer/line interfaces on the external surface can be reduced by surface polishing or coating, but internal layer/line interfaces are not easily removable.

Recently it has been reported that "transparent" parts have been 3D printed with ABS, copolyesters, and PETG filaments. Typically the parts are quite small and exhibit yellowing, bubbles, or cloudiness. In addition, the parts are typically printed with very low layer heights (0.05 mm) at a slow speed, so the part takes a very long time to be produced. At higher layer heights or faster speeds, the resulting part no longer appears transparent. There has also been no previous demonstrations with acrylic filaments, likely due to the difficulty in processing conventional acrylic filaments in a material extrusion style 3D printer.

Surprisingly, it has now been found that with the proper selection of composition of the material (acrylic and acrylic blends at certain Tgs, viscosities, and rheology conditions) plus the proper printing processing conditions (minimal fan, build plate and build chamber temperature coordinated with the material's transition temp, and set layer heights), internally transparent acrylic parts may be produced with haze less than 20%, preferably less than 15%, preferably less than 10%, and as low as less than 5% at normal layer heights without slowing down print speed.

In addition, a correlation of the material parameters with the print parameters has been identified such that higher Tg acrylics can be used to produce a reasonably low haze part if printed with a properly heated chamber and hotter heated build plate.

SUMMARY OF THE INVENTION

The invention relates to an acrylic copolymer composition for use in 3-D printing where the acrylic composition comprises a single matrix acrylic copolymer optionally alloyed with less than 5% other compatible, miscible or semi-miscible polymers, and optionally one or more additives dispersed within said matrix.

The matrix acrylic copolymer contains methyl methacrylate monomer units and from 0.1 to 60 weight percent, preferably 0.5 to 40, preferably 4 to 35, and more preferably 9 to 30 weight percent of one or more other monomers that are copolymerizable with said methylmethacrylate monomer units.

The matrix acrylic copolymer contains at least 90 weight percent, more preferably at least 95 weight percent, and most preferably 100 weight percent of (meth)acrylic monomer units, based on the total monomer units in the copolymer and has a weight average molecular weight of from 50,000 to 500,000, preferably between 55,000-300,000, and preferably from 65,000 to 200,000 g/mol, The matrix acrylic composition has a viscosity at a shear of 1 sec-1 of less than 100,000 Pa-sec, preferably less than 10,000 at a temperature of 230° C., and a viscosity of 20 to 2,000 Pa-s, preferably from 25 to 1,000 Pa-s, and more preferably 30 to 500 Pa-s at a shear rate of 100 sec-1 at a temperature of 230° C., as measured by a rotational viscometer according to ASTM C965, wherein said viscosity measurement is on the polymer composition without impact modifier.

The acrylic polymer composition may also contain one or more impact that are core-shell impact modifier, block copolymer or mixtures thereof. The impact modifier preferably is refractive index matched to the acrylic polymer matrix.

The acrylic composition may further contain one or more typical additives.

The acrylic copolymer composition of the invention may also be characterized in terms of its Tg, having a Tg of less than 160° C., preferably less than 130° C., preferably less than 120° C., preferably less than 110° C., preferably less than 100° C., preferably less than 90° C., preferably less than 85° C., preferably less than 80° C., and more preferably less than 75° C., and wherein the composition comprises:
 a) a continuous matrix phase consisting essentially of one or more acrylic polymers;
 b) optionally from 0 to 60 weight percent of impact modifiers, preferably from 9 to 40 weight percent.
 c) optionally from 0 to 50 volume percent, preferably 0.01 to 40 volume percent and more preferably from 0.05 to 25 volume percent, based on the total volume of the acrylic composition, of one or more other additives The acrylic polymer composition comprises an acrylic copolymer matrix phase comprising one or more acrylic copolymers having a Tg of from 70° C. to 160° C., and further comprises an effective amount of at least one non-polymeric additive that lowers the polymer composition Tg to less than 105° C., preferably less than 100° C., preferably less than 95° C., preferably less than 85° C., preferably less than 80° C., and more preferably less than 75° C., preferably a plasticizer at from 2 to 40 weight percent.

The invention also relates to an acrylic article, wherein said article is clear, wherein a 3-D printed part of 2 mm thickness, has a total white light transmittance of greater than 80%, preferably greater than 84%, more preferably greater than 86% and most preferably greater than 88%, and a haze of less than 80%, preferably less than 70%, and more preferably less than 60% can be obtained, as measured according to ASTM D1003, and wherein said composition is clear, wherein a 3-D printed part of 2 mm thickness, printed at a line height of 0.1 mm or more, 0.2 mm or more, 0.3 mm or more and 0.4 mm or more has an internal haze of less than 25%, preferably less than 20%, more preferably less than 15%, more preferably less than 10% and most preferably less than 5%.

The acrylic polymer composition may be in the form of a powder, pellets, or filament.

The invention also relates to an acrylic article made by a material extrusion additive manufacturing process, using the acrylic alloy composition above. The article will have has one or more of the following properties:
 a) a tensile elongation as measured by ASTM D638 of greater than 10 percent, and preferably greater than 20 percent,
 b) a fill density of greater than 85 percent, preferably greater than 90 percent, and most preferably greater than 95 percent,
 c) a stress at yield of greater than 35 MPa when measured by ASTM D638.

The invention also relates to a process for forming an extrusion additive (3D) acrylic article, of the above compositions, where the acrylic composition as a whole has a Tg between 70° C. and 160° C., preferably 80° C. to 150° C., preferably 90° C. to 150° C., preferably 110° C. to 150° C., preferably above 115° C., and preferably above 120° C., and preferably above 125° C. and where the build plate temperature during the printing process is maintained at least 1%, preferably 3%, preferably 5%, preferably 10%, more preferably 15%, and more preferably 20% above the acrylic composition's Tg as measured in C.

BRIEF DESCRIPTION OF THE DRAWINGS

FIGS. 12-17 show the rheology of parts from Example 5.

DETAILED DESCRIPTION OF THE INVENTION

Figure 1:
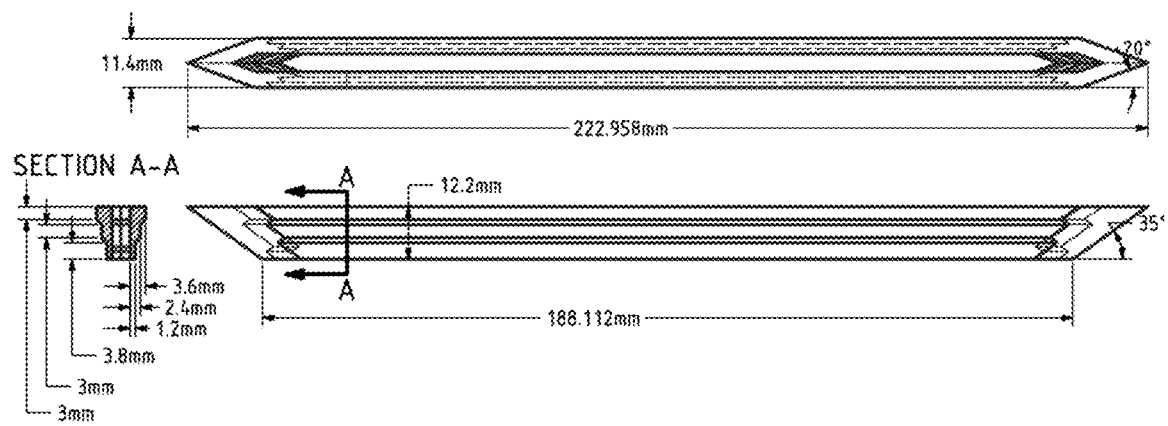
FIG. 1 is a diagram of the sample for the warping test

The invention relates to an acrylic composition that can be formed by a material extrusion additive manufacturing process (also referred to in this application as 3-D printing); to an acrylic filament useful in the process having a very uniform diameter; to acrylic articles made from the acrylic composition of the invention; and to a process for producing the acrylic extrusion additive articles. The invention also relates to process improvements that can be used for improved clarity. The acrylic composition useful in the invention has an over-all Tg of less than 160° C., preferably less than 150° C., preferably less than 140° C., preferably less than 130° C., preferably less than 120° C., preferably less than 114° C., preferably less than 105° C., preferably less than 95° C., preferably less than 90° C., preferably less than 85° C., preferably less than 80° C., and more preferably less than 75° C. The low Tg acrylic can be obtained in several ways. These include, but are not limited to a) an acrylic homopolymer or copolymer having the requisite Tg, b) a blend of an acrylic polymer and at least one low melt viscosity polymer, c) a blend of a higher Tg acrylic polymer with a non-polymeric component which reduces the over-all composition Tg, such as a plasticizer, and a combination of the above.

The invention also relates to a method of producing an internally transparent part where an acrylic composition is selected based off its chemical structure, Tg or transition temperature, viscosity, and flow characteristics. The composition is then extrusion 3D printed in a specified manner with slight overflow, minimal fan, heated build plate, and chamber temperature necessary to reach a proper internal temperature such that the internal layer lines merge and the parts become internally transparent. With such a composition selection under such printing conditions, the part is also very well adhered to the build plate, has no warpage, prints very well, has near 100% internal density, and very good mechanical properties.

All references cited are incorporated herein by reference. As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble faction molecular weight after extraction from gel is used.

"Copolymer" is used to mean a polymer having two or more different monomers. "Polymer" is used to mean both homopolymer and copolymers. Polymers may be straight chain, branched, star, comb, block, or any other structure. The polymers may be homogeneous, heterogeneous, and may have a gradient distribution of co-monomer units.

By (meth)acrylic, or (meth)acrylate is meant both methacrylic and acrylic, or methacrylate and acrylate. The term "acrylic" is used to mean both acrylic and methacrylic.

Tg is used as a surrogate measure of the transition temperature, the temperature where the material goes from being liquid-like to solid-like as seen by rheology. The transition temperature is the point where the log of viscosity vs. temperature changes slope following the Arrhenius equation from liquid-like to solid-like behavior. This transition point can be obtained by measuring the viscosity vs. temperature of the material at low shear, going from melt phase to room temperature. For example, a transition temp that is 10° C. lower than the internal temperature of the part during printing (roughly 130° C. when printed onto a 115° C. heated build plate with no heated chamber and minimal fan with the current technology) is desired, preferably 20° C. lower, even more preferably 25° C. lower, 30 C lower. The Tg of an acrylic is roughly 25° C. lower than the transition temperature. A Tg of below 160° C., 150° C., 140° C., 130° C., 120° C., 114° C., 105° C., 100° C., 95° C., 85° C., 80° C., 75° C. and above 60° C. is preferred for a material printed at room temp on a heated build plate depending on the temperature of the heated build plate. If a heated chamber is used, the part will experience a higher internal temperature and thus a higher Tg material can also be used and similarly if a hotter heated build plate is used, a higher Tg material can also be used. The glass transition temperature of a polymer, is measured by DSC according to the standard ASTM E1356.

First G'/G" crossover temperature refers to the first temperature when G' is greater than G" as measured by parallel plate rheology as low shear of a material as it goes from melt to room temperature where the storage modulus G', i.e. the elastic response is greater than the loss modulus G", i.e. the viscous response. Generally speaking, the dynamic moduli are a measure of the viscoelastic properties of the material, being the storage modulus G', i.e. the elastic response, and the loss modulus G", i.e. the viscous response of the polymer. The crossover temperature (G'=G") can be taken as the onset of stiffening because the elastic modulus at lower temperature is dominating the viscous response. Without being bound to any theory, it is believed a higher first G'/G" crossover temperature would allow a material to better hold its shape when being heat-soaked.

The transparency processing range is defined as the difference in temperature between the first G'/G" crossover temperature and the L-S transition temperature.

The transmission and haze are measured according to ASTM D1003 with a BYK-Gardner Haze-Gard machine.

Acrylic Polymer

"Acrylic polymer", as used herein is meant to include polymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, n-octyl acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, isodecyl acrylate and methacrylate, tertiobutyl cyclohexyl acrylate and methacrylate, tertiobutyl cyclohexanol methacrylate, trimethyl cyclohexyl acrylate and methacrylate, methoxy polyethylene glycol methacrylate and acrylate with 2-11 ethylene glycol units, penoxyethyl acrylate and methacrylate, alkoxylated phenol acrylate, ethoxylated phenyl acrylate and methacrylate, epoxypropyl methacrylate, tetrahydrofurfuryl acrylate and methacrylate, alkoxylated tetrahydrofurfuryl acrylate, cyclic trimethylolpropane formal acrylate, carprolactone acrylate, dimethylamino ethyl acrylate and methacrylate monomers. Alkyl (meth) acrylic acids such as methacrylic acid and acrylic acid or C1-C8 esters thereof can be useful for the monomer mixture. Most preferably the acrylic polymer is a copolymer having 70-99.5 weight percent of methyl methacrylate units and from 0.5 to 30 weight percent of one or more C1-8 straight or branched alkyl acrylate units.

The acrylic polymer has a weight average molecular weight of from 50,000 g/mol to 500,000 g/mol, and preferably from 55,000 g/mol to 300,000 g/mol. It has been found that the use of acrylics having a lower weight average molecular weight in the range, provides an increase in the density of material extrusion additive printed articles, increases the transparency and reduces warpage.

Preferably, the acrylic polymer contains little or no very high molecular weight fraction polymer, with less than 5 weight percent of the acrylic polymer, and preferably less than 2 weight percent of the acrylic polymer having a molecular weight of greater than 500,000 g/mol.

In another embodiment, the acrylic polymer comprises a blend of two or more of the polymers described in the above two embodiments.

The acrylic polymer can be formed by any known means, including but not limited to bulk polymerization, emulsion polymerization, solution polymerization and suspension polymerization.

Acrylic Copolymers:

The acrylic copolymers of the invention, have a Tg of less than 160° C., preferably less than 150° C., preferably less than 140° C., preferably less than 130° C., preferably less than 120° C., preferably less than 114° C., preferably less than 105° C., preferably less than 95° C., preferably less than 90° C., preferably less than 85° C., preferably less than 80° C., and more preferably less than 75° C. The acrylic copolymer of the invention has a Tg above 50° C., preferably above 55° C., and more preferably above 60° C.

In one preferred embodiment, at least 40 weight percent, preferably at least 50 weight percent, and most preferably at least 60 weight percent of the monomer units in the acrylic copolymer are methylmethacrylate monomer units. The co-monomers selected for the acrylic copolymer could be (meth)acrylic monomers, non-(meth)acrylic monomers, or mixtures thereof.

In one preferred embodiment, the acrylic copolymer is composed of greater than 90 weight percent, greater than 95 weight percent, and most preferably 100 weight percent acrylic monomers units. Low Tg acrylic monomers that can be copolymerized to lower the copolymer Tg to the specified level include, but are not limited to methyl acrylate, ethyl acrylate, butyl acrylate, ethylhexyl acrylate, hydroxyl ethyl acrylate, hydroxyl propyl acrylate, hydroxyl butyl acrylate, hexyl methacrylate, n-octyl acrylate, lauryl methacrylate, and butyl methacrylate.

These monomers are added at levels high enough to lower the Tg below 160° C., preferably less than 150° C., preferably less than 140° C., preferably less than 130° C., preferably less than 120° C., preferably less than 114° C., preferably less than 105° C., preferably less than 95° C., preferably less than 90° C., preferably less than 85° C., preferably less than 80° C., and more preferably less than 75° C., the Tg being easily calculated using the Fox equation, as is well known in the art and can be measured by DSC. For example, a 70 wt % methyl methacrylate (MMA)/30 wt % ethyl acrylate composition has a Tg of about 75° C.

The lower Tg copolymers tend to have a lower viscosity than higher Tg polymers, though other factors like molecular weight and branching will also affect viscosity. Impact modifiers, can be, and are preferably, added to the composition to both improve the impact strength and also increase the melt flow viscosity.

Acrylic Alloys

An alternative means for providing an overall lower Tg acrylic composition involves alloy blends of one or more higher Tg acrylic polymer(s) with one or more lower Tg (lower melt flow) polymers. This method is described in WO 2017/210,286.

The low melt viscosity polymer in the acrylic alloy composition must be compatible, semi-miscible, or miscible with the acrylic polymer. The low melt viscosity polymer and acrylic polymer should be capable of being blended in a ratio such that a single intimate mixture is generated without separation into distinct bulk phases. By "low melt viscosity polymer", as used herein means polymers having a melt flow rate of greater than 10 g/10 minutes, and preferably greater than 25g/10 minutes as measured by ASTM D1238 at 230° C./10.4 kg of force.

In one embodiment, the low melt viscosity polymer is a low molecular weight acrylic polymer or copolymer, meeting the high melt flow rate criteria. The low molecular weight acrylic polymer has a weight average molecular weight of less than 70,000, preferably less than 50,000, more preferably less than 45,000, and even less than 30,000 g/mol. Acrylic copolymers are preferred, and copolymers with a Tg of less than 160° C., and less than 90° C. are preferred for increased flexibility.

In a preferred embodiment, the low melt viscosity polymer of the invention is a polymer other than an acrylic polymer. The non-acrylic low melt viscosity polymer of this invention includes, but is not limited to, polyesters, cellulosic esters, polyethylene oxide, polypropylene glycol, polyethylene glycol, polypropylene glycol, styrene-acrylonitrile copolymers, polyvinyl chloride, polyvinyl acetate, polyvinyl alcohol, polyhydroxyalkanoates, ethylene-vinyl acetate copolymers, polyvinylidene fluoride and its copolymers, olefin-acrylate copolymers, olefin-acrylate-maleic anhydride copolymers, acrylate-maleic anhydride copolymers, styrenic-acrylate copolymers, styrenic polymers, maleic anhydride-styrene-vinyl acetate copolymers, other vinyl monomers typically used in free radical polymerization, and mixtures thereof.

Useful polyesters include, but are not limited to: poly (butylene terephthalate), poly(ethylene terephthalate), polyethylene terephthalate glycol, polylactic acid. A preferred polyester is polylactic acid.

Useful cellulosic esters include, but are not limited to: cellulose acetate, cellulose triacetate, cellulose propionate, cellulose acetate propionate, cellulose acetate butyrate, and cellulose acetate phthalate.

In one embodiment, the low melt viscosity polymer has a weight average molecular weight higher than the entanglement molecular weight of that polymer, as measured by gel permeation chromatography.

The low melt viscosity polymer makes up from 5 to 60 weight percent of the total alloy composition, preferably from 9 to 40 weight percent.

Acrylic Blends with Non-Polymers

A third method for providing an over-all acrylic composition having a low Tg (<160° C., <150° C., <140° C., <130° C., <120° C., <114° C., <105° C., <100° C., <95° C., <90° C., <85° C., <80° C., preferably <75° C.), is to blend a higher Tg acrylic polymer with one or more compounds known to lower the Tg, such as, but not limited to, plasticizers. The additive compound must be compatible, miscible or semi-miscible with the acrylic polymers. The Tg-lowering additive is typically added at from 0.2 to 40 weight percent, based on the weight of the acrylic polymer, preferably from 2 to 20 weight percent.

In one embodiment, a useful class of plasticizers are specialty epoxides, such as 1,2 dihydroxy alkanes with a molecular weight above 200 grams per mole or vegetable oil polyols having a molecular weight above 200 grams per mole, as described in PCT/US2019/012241.

In another embodiment, phthalates, such as di (2-ethyl hexyl) phthalate, diisononyl phthalate, diisodecyl phthalate, and diisooctyl phthalate, can be used.

In another embodiment, adipates, such as, but not limited to, di(2-ethyl hexyl) adipate, can be used.

Impact Modifiers

While the acrylic compositions of the invention may contain no impact modifier, in a preferred embodiment, and to avoid being too fragile, the acrylic composition of the invention includes one or more types of impact modifiers. Preferably the acrylic composition contains impact modifiers at a level of from 5 to 60 weight percent, preferably 9 to 40 weight percent, and more preferably from 15 to 35 weight percent, based on the overall composition. The impact modifiers can be any impact modifier that is compatible, miscible, or semi-miscible with the acrylic composition, as known in the art. Useful impact modifiers include, but are not limited to linear block copolymers and both soft-core and hard-core core-shell impact modifiers. In a preferred embodiment, the impact modifiers have acrylic blocks, or acrylic shells.

While not being bound by any particular theory, it is believed that the impact modifier provides elongation, flexibility, and toughness.

In a preferred embodiment, the impact modifier of the invention is a multi-stage, sequentially-produced polymer having a core/shell particle structure of at least three layers made of a hard core layer, one or more intermediate elastomeric layers, and a hard shell layer. The presence of a hard core layer provides a desirable balance of good impact strength, high modulus, and excellent UV resistance, not achieved with a core/shell modifier that possesses a soft-core layer.

The hard core layer (Tg>0° C., preferably Tg>20 □C) is typically a single composition polymer, but can also include the combination of a small amount of a low Tg seed on which the hard core layer is formed. For example, a small 5% rubber core seed that becomes dispersed into a hard core layer would be included in the invention as a hard core layer, as long as the combination behaves as a hard core layer. The hard core layer can be chosen from any thermoplastic meeting the Tg requirements. Preferably, the hard core layer is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Styrenics units include styrene, and derivatives thereof such as, but not limited to, alpha-methyl styrene, and para methyl styrene. In one embodiment the hard-core layer is all-acrylic.

The intermediate layer or layers are elastomeric, having a Tg of less than 0° C., and preferably less than −20° C. Preferred elastomers include polymers and copolymers of alkyl acrylates, dienes, styrenics, and mixtures thereof. Preferably the soft intermediate layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful dienes include, but are not limited to isoprene and butadiene.

Useful styrenics include, but are not limited to alpha methyl styrene and parap methyl styrene The shell layer can be made of one or more shell layers, having a Tg>0° C., more preferably Tg>20° C. The shell layer may be the same or different composition from the hard core layer.

Preferably the multi-stage polymer is a three stage composition wherein the stages are present in ranges of 10 to 40 percent by weight, preferably 10 to 20 percent, of the first stage (a), 40 to 70 percent, preferably 50 to 60, of the second intermediate stage (b), and 10 to 50 percent, preferably 20 to 40, of the final stage (c), all percentages based on the total weight of the three-stage polymer particle.

In one embodiment the core layer is a crosslinked polymethylmethacrylate-ethylacrylate copolymer, the middle layer is a crosslinked polybutylacrylate-styrene copolymer, and the outer shell is a polymethylmethacrylate-ethylacrylate copolymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

In a preferred embodiment the refractive index of the core/shell particle matches the total refractive index of the matrix made of the acrylic polymer composition. By match is meant that the refractive index of the core/shell particle should be within 0.03 units of the matrix polymer, and preferably within 0.02 units.

In one embodiment, the acrylic polymer composition of the invention could contain reactive functional groups, either by using a functional monomer, or by a post-treatment. Once the functional polymer is processed into a useful article, it could then be reacted or cross-linked, such as by UV radiation, or e-beam, for increased integrity. Cross-linking is known in the art to generally increase the tensile and flexural moduli, and reduce solubility and permeability of the cross-linked material, all of which could be advantageous physical property enhancements depending on the material's final application.

In one preferred embodiment, the impact modifier is selected to have a minimal effect on increasing the viscosity of the low Tg acrylic composition. Higher efficiency impact modifiers with a high rubber content allow for a lower loading, and therefore less effect on increasing the composition viscosity. Nanostrength® block copolymers from Arkema which self-assemble, also have less of a detrimental effect on the viscosity of the composition.

Acrylic matrices containing high levels of comonomer such as ethyl acrylate require a specifically designed impact modifier in order to take advantage of the increased ductility of the matrix.

In one embodiment, the multi-stage, sequentially-produced polymer is a specifically designed impact modifier and is characterized by:
  (a) optionally, but preferably, non-elastomeric, relatively hard first stage having a glass transition temperature of greater than 25° C., polymerized from a monomer mixture of the monomers described above for the rigid thermoplastic copolymer along with 0 to 10 weight percent of a copolymerizable polyfunctional crosslinking monomer, and 0 to 10 weight percent of a copolymerizable graftlinking monomer having two or more addition polymerizable unsaturated reactive groups which participate in the polymerization reaction at substantially different rates, such as an allyl, methallyl or crotyl ester of an α,β-unsaturated carboxylic acid or diacid;

(b) an intermediate elastomeric stage polymerized in the presence of a product containing the first stage from a monomer mixture comprising 50 to 99.9 weight percent of an alkyl acrylate and/or alkyl methacrylate mixtures thereof wherein the alkyl groups contain 1 to 8 carbon atoms, 0 to 49.9 weight percent of a copolymerizable monoethylenically unsaturated monomer, 0 to 5.0 weight percent of a copolymerizable polyfunctional crosslinking monomer and 0.05 to 5.0 weight percent of a copolymerizable graftlinking monomer as described above, said elastomeric stage further characterized in that it would exhibit a glass transition temperature of 25° C. or less if the monomers were polymerized in the absence of the product containing the first stage; and (c) one or more, relatively hard, final stages polymerized in the presence of a product containing the first and intermediate stages from a monomer mixture of the monomers described above for the rigid thermoplastic polymer, the final stage further characterized in that it would exhibit a glass transition temperature of greater than 50° C. if the monomers were polymerized in the absence of the product containing the first and intermediate stages, the graft linking monomer having two or more addition polymerizable unsaturated reactive groups which participate in the polymerization reaction at substantially different rates and the cross-linking monomer having a plurality of addition polymerizable unsaturated groups all of which participate in the polymerization reaction at about the same rate as one another.

Preferably the multi-stage polymer is a three stage composition wherein the stages are present in ranges of 10 to 40 percent by weight, preferably 10 to 20 percent, of the first stage (a), 45 to 70 percent, preferably 50 to 60, of the second intermediate stage (b), and 10 to 50 percent, preferably 20 to 40, of the final stage (c), all percentages based on the total weight of the three-stage polymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers (which term includes copolymers as well as homopolymers) which are prepared in aqueous dispersion or emulsion and in which successive monomer changes are polymerized onto or in the presence of a preformed latex prepared by the polymerization of a prior monomer charge and stage. In this type of polymerization, the succeeding stage is attached to and intimately associated with the preceding stage. Thus, the sequentially prepared polymers of the present invention are made by a process in which the total particle content is substantially constant upon completion of the first-stage polymerization, i.e., new additional and distinct particles are avoided after formation of the first-stage particle.

The polymerizations are carried out in the presence of an initiator and may include a polymerization regulator which serves as a chain transfer agent. The final particle size of the sequentially produced polymer may vary from 100 to 350 nm with the preferred range being 200 to 300 nm.

The type and level of emulsifier utilized controls the particle size of the intermediate-stage latex particles. For the most part, the soaps normally used in emulsion polymerization can be used satisfactorily provided care is exercised in utilizing the minimum amount necessary to give the desired result and the polymer is isolated by coagulation. If the latex is isolated by spray drying, the selection of emulsifier becomes more critical since it remains with the polymer.

The level of emulsifier is preferably below one percent by weight, preferably 0.1 to 0.6%, based on the total weight of polymerizable monomers charged in all stages. Useful emulsifying agents include common soaps, alkylbenzenesulfonates, such as sodium dodecyl benzenesulfonate, alkylphenoxypolyethylene sulfonates, sodium lauryl sulfate, salts of long-chain amines, salts of long-chain carboxylic and sulfonic acids, etc. In general, the emulsifier should be compounds containing hydrocarbon groups of 8-22 carbon atoms coupled to highly polar solubilizing groups such as alkali metal and ammonium carboxylate groups, sulfate half ester groups, sulfonate groups, phosphate partial ester groups and the like.

The polymerization medium in each stage will contain an effective amount of a suitable free radical generating polymerization initiator, which is activated either thermally or by an oxidation-reduction (or redox) reaction. The preferred initiators are those which are activated thermally, such as persulfates; however, redox initiators may be used. Examples of suitable oil-soluble, water-insoluble initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble redox initiators may also be used; initiator combinations are sodium persulfate-sodium hydrosulfite, potassium persulfate-sodium formaldehyde sulfoxylate, etc.

The multi-stage sequential emulsion polymerization can be carried out at temperatures ranging from about 0° C. to 125° C., with 30° C. to 95° C. being preferred. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of stages containing lower alkyl methacrylate. The free radical initiator will be used in an effective amount, which will vary depending on the monomers, the temperature and the method of addition, but, generally, the quantity of initiator will vary from about 0.001 to 2% by weight in each polymerization stage based on the weight of the monomer charge but should not exceed about 5% by weight based on the total weight of the monomers charged in all stages.

The rigid thermoplastic copolymer consists of the monomer methyl methacrylate at a level of 50-85% copolymerized with another alkyl acrylate or alkyl methacrylate wherein the alkyl group consists of 1 to 4 carbon atoms and is present at a level of 15-50% weight percent. The molecular weight of the copolymer is in the range of 50,000 to about 400,000 daltons. Preferred monomers are ethyl acrylate and methyl acrylate at levels of about 25 weight percent with a molecular weight of 200,000-350,000 daltons. The rigid thermoplastic can be prepared by any standard method of preparing high polymers of methacrylates and acrylates, include bulk, solvent, and emulsion polymerization.

Additives

The acrylic polymer composition may further contain other additives typically present in acrylic formulations, including but not limited to, stabilizers, plasticizers, fillers, coloring agents, pigments, antioxidants, antistatic agents, surfactants, toner, fragrances, de-odorizers, refractive index matching additives, additives with specific light diffraction or light reflection characteristics, and dispersing aids. If fillers are added, they represent 0.01 to 50 volume percent, preferably 0.01 to 40 volume percent, and most preferably from 0.05 to 25 volume percent of the total volume of the acrylic composition.

The fillers can be in the form of powders, platelets, beads, and particles. Smaller materials, with low aspect ratios are preferred, to avoid possible fouling of the nozzle, though this is less important when the acrylic composition is used with larger nozzle sizes. Useful fillers include, but are not limited to, carbon fiber, milled carbon fiber, carbon powder, carbon nanotubes, boron nitride, diamond, glass beads, glass fibers, titanium dioxide, zinc oxide, PdS, barium sulfate ($BaSO_4$), silicon dioxide, nano-silica ($SiO_2$), calcium carbonate ($CaCO_3$), $CaCO_4$, natural and synthetic clay systems, aluminosilicates, montmorillonite, Aramid fiber, polyaryl ether ketone fibers, graphite, graphite nano-platelets, graphite oxide, graphene, milled carbon fibers, nano-fibers (generally having an average fiber length of from 100 to 150 nm) and hollow glass or ceramic spheres, dyes, colorants, pigment, metallic particles, metallic flakes, opalescent dyes, fluorescent dyes, polymeric particles that may be cross-linked and are comprised of polymers selected from acrylic polymers, cross-linked acrylic beads (average particle size from 20 μm-500 μm), styrene-based particles, copolymers comprising greater than 50 percent by weight styrene monomer units, silicones, polyamides, nano-silica, fluoropolymers, poly(tetrafluoroethylene), poly(vinylidene fluoride), and vinylidene fluoride/hexafluoropropylene copolymers, de-ordorizers, fragrances, internal release agents, emissivity agents, diffusing particles, reflective particles, optical brighteners, flame retardants, UV stabilizers, anti-microbial additives, cellulose, anti-oxidants and mixtures thereof.

In one embodiment, the filler is added to produce special visual effects. Useful fillers include colorants, dyes, and inorganic particles, including fluorescent dyes, metal filings, flakes, and cross-linked acrylic beads (average particle size from 20 μm-500 μm). Natural-looking variegated materials, that have a metallic or opalescent appearance can be made to simulate natural materials, such as granite, minerals, stone, metal ore The metal or pearlescent material is present in the acrylic composition at from 0.01 to 10 weight percent, and preferably 3.5 to 6.5% weight percent, based on the weight of the acrylic composition. In one embodiment, the acrylic composition contains pearlescent compounds and no metal compound. In another embodiment the thermoplastic composite contains pearlescent compounds and metal compound(s). In a preferred embodiment, the thermoplastic composite contain metal compound(s) and no pearlescent compound.

Metal compounds useful in the invention include, but are not limited to, metal flakes, chips and filings. Useful metal compounds include metals, metal-containing molecules and complexes of transition metals, or lanthanide metals, and combinations thereof. Examples include aluminum, copper, silver, gold, platinum, palladium, nickel, cobalt, tin, niobium, chromium, stainless steel, and combinations or alloys thereof, including, for example, brass and bronze. The metal compound may also be a metal carbide, metal oxide, metal nitride, metal sulfide, and combinations thereof. The metal compounds can have particle sizes averaging from 1 microns to 25 micron and preferably 2 micron to 20 micron in the largest direction. The metal compounds may be flat flakes, or may be particles of various shapes. Metal flake pigments generally have a thickness in the range of from 40 to 150 nm.

Pearlescent compounds useful in the invention are those known in the art and include, but are not limited to, platelets of mineral mica which is muscovite or potassium aluminum hydroxide fluoride, and platelets based on titanium dioxide. The platelets are coated with a thin layer of metal oxide selected from the group consisting of rutile titanium dioxide, ferric oxide and tin oxide and mixtures thereof. The pearlescent compound platelets generally have a particle size of about 2 to about 130 microns, more preferably about 10 to about 50 microns. The pearlescent pigments may be colored or non-colored.

In one embodiment, diffusers, refractors, or other optical modifiers can be added to the composition of the invention to provide a 3-D printable diffuser/refractor material.

In one embodiment, the use of de-odorizers and fragrances can be added to the composition of the invention to mask the scent of acrylic. These may be in liquid or solid form and consist of detergents, gels, plastics, soaps, bleach, etc. In addition, the use of an internal release agent/emissivity agent (wax)—using a release agent allows for easier demolding, prevention of O2 inhibition and odor control—stearic acid, paraffins, stearyl alcohol, ethylene bistearamide, AOT, lecithin.

In one embodiment, additives that impart a useful optical effect such as light scattering, light reflection, and/or surface matting can be added to the composition of the invention to provide 3-D printable materials with optical function, such as diffusing materials and/or reflective materials. Additives for diffusion may be organic or inorganic particles, or combinations of organic and inorganic diffusion particles, for example U.S. Pat. No. 9,547,108 B2.

Useful organic diffusion particles having refractive index mis-match with the polymer matrix of +/−0.01 to 0.25, as measured according to ASTM D 542, can be comprised of polymers selected from acrylic polymers and copolymer, Styrene-based particles and copolymers (comprising greater than 50 percent by weight styrene monomer units), silicones, and fluoropolymers, including but not limited to PTFE, PVDF, and vinylidene fluoride/hexafluoropropylene copolymers. Organic diffusion particles may or may not be crosslinked. Organic diffusion particles may be present from 0 to 20 weight percent, preferably 0.5 to 10 weight percent.

Useful inorganic diffusion particles having refractive index mis-match with the polymer matrix of +/−0.01 to 0.5 as measured according to ASTM D 542 may be selected from Titanium dioxide, Zinc oxide, PdS, barium sulfate, Silicon Dioxide, Calcium Carbonate, natural and synthetic clay systems (aluminosilicates, for example Montmorillonite). Inorganic diffusion particles may be present from 0 to 20 weight percent. Some inorganic diffusion particles may also be useful for light reflection.

Optical brighteners may also be added to the composition of the invention to provide 3-D printable material with improved optical effects in printed parts. Optical brighteners can be white pigments with particle sizes in the nanoscale range, preferably 10-300 nm mean particle size. Examples include but are not limited to nano titanium dioxide, nano zinc compounds, including but not limited to nano zinc borate. The brighteners may be present from 0.00001 to 1 weight percent, 0.0001-0.5, 0.001 to 0.1 weight percent.

Properties

Key performance properties of the composition of the invention include:

1) Excellent optical clarity. A 3-D printed part is more difficult to provide with optical clarity than an injection molded, or compression molded part, due to the many layer-to-layer interfaces. For a 3-D printed part of 3.2 mm thickness, a total white light transmittance of greater than 80%, preferably greater than 84%, more preferably greater than 86% and most preferably greater than 88% can be obtained. A haze of less than 80%, preferably less than 70%, and more preferably less than 60% can be obtained. Haze and TWLT are obtained according to ASTM D1003. The haze of the article can be improved by treatment of the surface, such as polishing.

In one embodiment, a 3-D printed internally transparent part can be printed with the acrylic composition of the invention, at 0.05 mm layer heights, and even at 0.1 mm layer heights, to produce excellent clarity and very low haze (haze of less than 50%, preferably less than 40%, and even below 25% based on ASTM D1003 on a 2 mm thick part). The layer height, as known in the art, is the Z-direction thickness of the constituent layers as they are deposited by the extruder in the X-Y direction The best clarity is obtained with a print temperature above 60° C., a build plate temperature above the Tg of the acrylic composition, and no fan. Post treatment, such as coating, sanding, finishing, tumbling, or vapor polishing can further improve the transparency of a printed article While not being bound by any particular theory, it is believed that clarity is high due to the internal temperature of the print during printing, in one embodiment about 130° C.; this temperature is significantly above the Tg to allow the layer lines to be merged, internal stresses to be released, and the part to become fully dense and internally clear. The Tg difference is maintained for at least 5, preferably 10, more preferably 20 or more minutes following printing. This allows the polymer chains to be mobile and fluid, and to entangle with the polymer chains from the material added above, below, and beside it, and thereby reduce or eliminate interfaces between layers—leading to both internal clarity, and also good Z direction mechanical properties and generally more robust, stronger, closer to isotropic parts.

2) Tensile elongation at break: The composition of the invention has a tensile elongation when printed and tested in the XY direction, as measured by ASTM D638, of greater than 10 percent, and preferably greater than 20 percent.

3) Little or no warpage, across a wide temperature range of 220° C. to 260° C., allowing the acrylic composition of the invention to be used across a wide range of commercial and specialty printers, with parts as large as 12 inches. Warpage is measured using the following warp test (see more info in example 2).

A specimen was printed in order to evaluate the warping tendencies of different acrylic compositions. The geometry is specifically designed to exacerbate the fundamental warping characteristics of the polymer as it is printing. The thickness of the part increases with height, making the part more difficult as the print progresses. The greater percentage of the specimen that can be printed without warping or coming detached from the build plate the better the printing performance. If the entire part can be printed and remains flat, the material has optimal warping characteristics and can print large parts (greater than 10 inches) without warping.

The warpage relates to the ability of a part to adhere to the base plate of a melt extrusion printer, which is necessary for successful printing.

4) Yield stress: The stress at yield of greater than 30 and more preferably greater than 35 MPa when measured by ASTM D638.

5) Fill density: Extrusion printed articles that are additively manufactured with the acrylic composition of the invention have a fill density of greater than 95 percent, preferably greater than 98 percent, preferably greater than 99 percent, as calculated by dividing the density of the printed part by the bulk density of the material. A high fill density can be encouraged by a slight overflow of material at each given spot.

6) Printed article clarity: Extrusion additive manufactured articles using the acrylic composition of the invention have a light transmittance of greater than 50%, preferably greater than 60%, and more preferably greater than 65% when measured on a 2.1 mm thick sample using ASTM D1003, the printed article having 10 layers and each layer having line width of 0.4 mm.

The low Tg acrylic copolymer of the invention provides a higher clarity than an acrylic alloy. While not being bound by any theory, it is believed the lower clarity of the alloy is due to the lack of compatibility between components of an alloy.

7) The "ideal" article: The composition of the invention produces a transparent article that does not yellow over time. Other technologies, such as UV-curing SLA style printing produces yellow, and brittle parts. Other non-acrylic thermoplastics either produce yellow parts (ABS, copolyester) or hazy parts (PC, PetG). With other acrylic materials, outside of this invention, one would observe layers and lines within the part, and poor Z build direction properties (as with all other 3-D Material Extrusion printed materials). But with this set of materials and in this printing window, one can obtain internally transparent material, 99%+ relative internal density, and near isotropic parts.

Filament

In one embodiment, the acrylic composition is extruded into a filament, for use in a material extrusion additive process. The filament can be a single strand of the acrylic composition, or can be in the form of a coextruded multi-phase filament. In one embodiment, the filament has a middle layer composition of the acrylic composition, surrounded by a sheath containing a different acrylic composition, for example containing a special effects additive, or vice versa.

Filament formed from the acrylic composition of the invention has little shrinkage or warpage, forming a filament that is very uniform in diameter. The filament having the acrylic composition of the invention varies in diameter by less than +/−5% over a ten foot length, and preferably less than 3 percent variance in diameter over a ten foot of length. The low variance in the diameter of the filament is a key to its use in the material extrusion additive manufacturing process, as the calculations on the feed rate, and thereby the resulting density of the printed article, are based on calculations assuming a constant filament diameter.

3D Printing Process:

The acrylic composition of the invention is used as a powder or pellets, and in a preferred embodiment is formed into a filament, generally by an extrusion process.

The acrylic composition will be 3D printed in a material extrusion (fused deposition modeling, fused filament fabrication) style 3D printer with or without filaments (any size diameter, including 1.75 mm, 2.85 mm or other sizes) and with any sized nozzle at any speed that can use filaments, pellets, powders, or other forms of the acrylic composition. Such machine could be any machine falling within the definition for either a material extrusion or a hybrid system that contains one or more material extrusion heads according to ISO/ASTM52900. The 3D printing of this invention is not a laser sintering process. The compositions can be made into filaments for such purposes. They could potentially be even sprayed-nozzled onto the surface (sprayed melted plastic) to be printed, such as by the Arburg Freeformer technology.

A general description of the printing process would involve the following steps: Feeding the acrylic composition filament, pellets or powder into the 3D printer. The computer controls of the printer will be set to provide a set volume flow of material, and to space the printed lines at a certain spacing. The machine will feed the acrylic composition to a heated nozzle at the set speed, the printer moving the nozzle into the proper position for depositing the set amount of acrylic composition.

In a preferred embodiment, the polymer has a low shear melt viscosity as described above.

In a preferred embodiment the material extrusion additive manufacturing printer would generally have a heated build plate of 50-150° C. (preferably above 60° C., more preferably above 75° C.). In another embodiment the build plate temperature during the printing process is maintained at least 1%, preferably 3%, preferably 5%, preferably 10%, more preferably 15%, and more preferably 20% above the acrylic composition's Tg as measured in C.

The printer would feature one or more heated nozzles through which the material is extruded. These nozzles would be able to reach 200° C. (preferably 250° C., more preferably above 300° C.). The printer would feature a build environment open to ambient conditions, or be enclosed. In another embodiment the printer could feature additional controls such as an actively heated or cooled build environment. An actively heated build environment could be used to decrease the warpage of the acrylic composition during printing. In another embodiment the printer could feature a radiative heating element within an open or enclosed build volume.

In another embodiment the printer would feature a mixing head that combines multiple feedstocks, such as the Diamond Hotend, wherein any of the feedstock compositions, or the final composition after mixing meets the specifications described herein. In another embodiment a printer fed with multiple compositions combined within a direct pellet extruder print head wherein any of the compositions or the final mixed composition matches the specifications described here. In one preferred embodiment, the 3-D printer is programmed to operate at a slight overflow of 1% to 10% overflow. This means that the volume of the acrylic composition fed by the printer is higher than the calculated volume required for the 3-D article being formed. The overflow packs the acrylic composition closer together, increasing the part density while increasing the strength, mechanical, and optical properties of the printed article. The overflow can be set by two different means. In the first method, the software is set to feed a higher percent of material into the nozzle than would be normally needed. In the second method, the software would be set to decrease the spacing between lines, and thus create an overlap in the lines, resulting in extra material being printed into the article.

Process parameters of the 3-D printer can be adjusted to minimize shrinkage and warpage, and to produce 3-D printed parts having optimum strength and elongation. The use of selected process parameters applies to any extrusion/melt 3-D printer, and preferably to filament printing.

Other process conditions can improve the open time of the printed article, resulting in excellent clarity and Z direction physical properties. These include, for example include raising the temperature of the build plate and/or build chamber of the printer. While not being bound by any particular theory, it is believed that for best results, the internal temperature of the print should be at least 25° C., preferably at least 30° C., preferably at least 40° C., and most preferably above 50° C. above the Tg of the acrylic composition. In a preferred embodiment, the outer shell of the printed article needs to be stiff enough, and cool down fast enough for some part resolution, while the internal temperature is as high as can be.

Transparent Material Extrusion Additive Process:

In one embodiment, the 3-D printer is programmed to move the extrusion nozzle at a slightly slower than normal print speed (25 mm/s) with the part-cooling fan off to allow the part retain more heat. The 3D printer will extrude very thin layers of 0.05 mm. The 3-D printer will operate at a slight overflow of 1% to 10% overflow to allow the voids between the layers to be filled. The build plate is set near or slightly above the Tg of the material and the nozzle is set at the upper range of the material's processing temperature. A low Tg acrylic can achieve internal transparency when using this method (with a heated build plate at 85° C.). Surprisingly, when measuring transparency and haze according to ASTM D1003 on a 3.2 mm thick plaque with BYK-Gardner Haze-Gard an acrylic material was the only material able to achieve less than 20% haze, preferably 15%, 10%, most preferred 5% and greater than 84% transmission, 86%, 88%, 89%. This held true even at layer heights of 0.1 mm.

In another embodiment, the heated build plate temperature can be increased beyond the Tg of the material to further slow the cooling rate of the extruded plastic and allow it to stay above its liquid solid transition point for longer period of time. One would think that increasing build surface temperature well beyond the Tg of the material would cause it to droop and deform; but surprisingly, it was found that acrylic materials of this invention were able to hold its shape during the printing process with the build plate temperature more than 40° C. beyond the material's Tg. It is postulated that the acrylic polymer is able to be soft and still hold its shape because of the large distance between the L-S transition point and the first G'/G" cross over point on the rheology curve discussed above/below. Using an IR thermal camera, it was shown that the interior of the part was 50° C. above the Tg of the material, but the part retains its shape as the internal temperature still falls below the first crossover point. The higher build plate temperate allowed for improved transparency.

The higher build plate temperature had the unexpected effect of removing the requirement of printing very thin layers/minimized layer heights. Surprisingly, 3.2 mm plaques printed at 25 mm/sec with layer heights of 0.2 mm, 0.3 mm, and even 0.4 mm layer heights exhibited less than 10% haze. Layer heights of 0.3 mm and 0.4 mm are often reserved for faster, imprecise or very large 3D prints, and yet the with this technique we could generate an internally clear part without any layer lines. With 0.4 mm layer times an object can be generated 8 times faster than with one with 0.05 mm layers.

Applications/Uses

Acrylic resins are widely used in applications where the beneficial properties (clarity, weathering, etc.) are desired. This 3D printable acrylic material can be used in multiple markets including (but not limited to): automotive, building and construction, capstock, aeronautic, aerospace, photovoltaic, medical, computer-related, telecommunication, and wind energy. These applications include (but are not limited to): exterior paneling, automotive body panels, auto body trim, recreational vehicle body panels or trims, exterior panels for recreational sporting equipment, marine equipment, exterior panels for outdoor lawn, garden and agricultural equipment and exterior paneling for marine, aerospace structures, aircraft, public transportation applications, interior paneling applications, interior automotive trims, components for head and or tail lights on vehicles, lenses, prototyping, display panels, interior panels for marine equipment, interior panels for aerospace and aircraft, interior panels for public transportation applications, and paneling for appliances, furniture, and cabinets, recreational vehicle, sporting equipment, marine, aerospace, decking, railing, siding, window and door profiles, dishwasher and dryers, refrigerator and freezers, appliance housing or doors, bathtubs, shower stalls, spas, counters, and storage facilities, decorative exterior trim, molding side trim, quarter panel trim panels, fender and fender extensions, louvers, rear end panels, caps for pickup truck back, rearview mirror housings, accessories for trucks, buses, campers, vans, and mass transit vehicles, b pillar extensions, and the like; appliances and tools such as lawn and garden implements, bathroom fixtures for mobile homes, fencing, components of pleasure boats, exterior components of mobile homes, lawn furniture such as chair and table frames, pipe and pipe end caps, luggage, shower stalls for mobile homes, toilet seats, signs, spas, air conditioner and heat pump components, kitchen housewares, bead molded picnic coolers, picnic trays and jugs, and trash cans; venetian blind components; sporting goods such as sailboards, sailboats; plumbing parts such as lavatory parts and the like; construction components, in addition to those mentioned previously, the additional components including architectural moldings, door molding, louvers, and shutters, mobile home skirting, residential or commercial doors, siding accessories, window cladding, storm window frames, skylight frames, end caps for gutters, awnings, car port roofs, lamp, lighting equipment, sensor, custom carry cash for consumer items, silverware, trim for cars, prototypes, figurines, dentures, hardware, cabinet, ball-joint, hosing, glasses, cage, UV protector screen, window, signage, toys, medical equipment such as implants and equipment components, lighting appliques, luminares, window coverings, surface modification, visualization aids 3D model based on, medical imaging, architectural models, topographic data, mathematical analysis, or other data sets. Education aids, props, costumes, park benches, robotics components, electrical enclosures, 3D printer components, jigs, fixtures, manufacturing aids, molds, sculptures, statues, board games, miniatures, dioramas, trophies, drones, UAV's, medical devices (Class I, Class II, and Class III according to FDA Code of Federal regulations Title 21), light guides, internal lighting, integrated optical components, display components, instrumentation, see through components, solar cells, fixtures and rigging for solar power generating systems, artificial nails, dosimeters, jewelry, footwear, fabric, firearm components, cell phone cases, packaging.

EXAMPLES

Example 1

Filaments were extruded having the compositions listed below. The filament was the 3-D printed and tested for X-Y tensile strength, X-Y tensile modulus, X-Y elongation at break, Z tensile strength and Z elongation at break. The data is shown in the Table below:

Sample 1=acrylic copolymer with 22-28% EA and high impact modifier

Sample 2=acrylic copolymer with 22-28% EA and low impact modifier

TABLE 1

| PROPERTY | Sample 1 | Sample 2 | Polylactic acid | ABS | PETG |
|---|---|---|---|---|---|
| X-Y Tensile Strength (MPa) | 39 | 47 | 62 | 35 | 51 |
| X-Y Tensile Modulus (GPa) | 2.1 | 2.6 | 3.5 | 1.4 | — |
| X-Y Elongation at Break | 30 | 30 | 5.5 | 6 | — |
| Z Tensile Strength (MPa) | 30 | 25 | 35 | 23 | 31 |
| Z Elongation at Break | 2.3 | 1.2 | — | — | — |

Example 2

Warping of Various PMMA Compositions

A specimen, FIG. 1, was printed in order to evaluate the warping tendencies of different acrylic compositions. The geometry is specifically designed to exacerbate the fundamental warping characteristics of the polymer as it is printing. The thickness of the part increases with height, making the part more difficult as the print progresses. The greater percentage of the specimen that can be printed without warping or coming detached from the build plate the better the printing performance. If the entire part can be printed and remains flat, the material has optimal warping characteristics and can print large parts (greater than 10 inches) without warping.

Warping is very dependent on build plate temperature relative to the $T_g$ of the material. The curling effect known in the art as warping is caused by the contraction of the material as it cools after being deposited by the nozzle. This contraction causes a shear force between the layers, which will in turn cause the part to bend. By heating the build plate to near the $T_g$ of the polymer will reduce the effect of these shear forces as the polymer stays in the mobile phase for longer.

A variety of build plate temperatures were used from 70% of the $T_g$ of the polymer to 110% of the polymer's $T_g$, and the completion percentage of the specimen was recorded at these different temperatures. The completion percentage was defined as the minimum height printed measured normal to the x-y print plane divided by the theoretical maximum height of the specimen. As the specimen prints, any warping will cause the final dimensions of certain sections to become smaller than the nominal dimension of the model. By measuring the minimum thickness, we are capturing the section of the part most affected by warping. The minimum thickness can also be thought of as the section of the specimen that pulled up from the build plate earliest.

Figure 2:
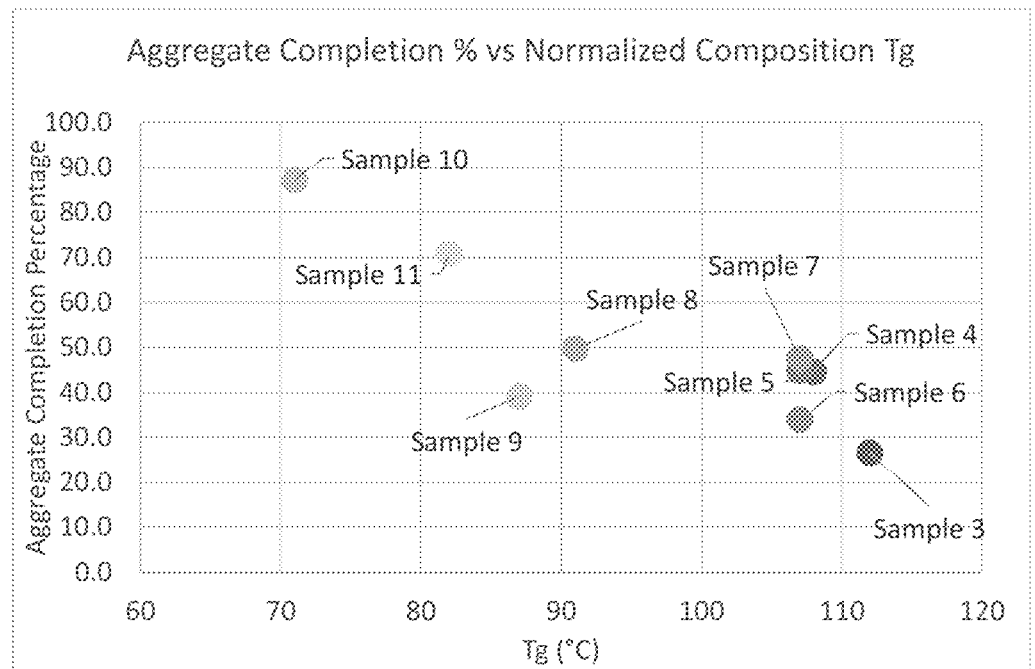
FIG. 2 shows the warping results from Example 2.

The sums of the completion percentages across the 70%-110% of the $T_g$ range gives us an aggregate completion percentage that can be used to compare the relative performance of different polymers, with 100% being the theoretical maximum of a material that completed the full print for the entire range. The results for a series of compositions can be seen in Table 2 and FIG. 2.

TABLE 2

Comparison of equally impact modified acrylic compositions

|  | $T_g$ (° C.) | Aggregate Percent Completion (%) |
|---|---|---|
| Sample 3 | 110-115 | 27 |
| Sample 4 | 105-110 | 45 |
| Sample 5 | 105-110 | 45 |
| Sample 6 | 105-110 | 34 |
| Sample 7 | 105-110 | 48 |
| Sample 8 | 90-95 | 50 |
| Sample 9 | 85-90 | 39 |
| Sample 10 | 70-75 | 87 |
| Sample 11 | 80-85 | 71 |

A variety of compositions were tested using the described experimental procedure. Samples 3-10 featured in Table 2 and FIG. 2 had varying amounts of an ethyl acrylate co-monomer to reduce the $T_g$ of the material. The comonomer loading varied from 0.3% to 28%. Each of the samples contained 15-35% of a core-shell impact modifier. The molecular weights of the samples varied from 50,000 g/mol to 300,000 g/mol. As seen in FIG. 1, the ability of the composition to print a part without warping is highly dependent on the Tg of the composition. Surprisingly, the amount of warping seemingly did not correlate with molecular weight, as Sample 10 had one of the highest molecular weights, but had the best performance overall. Sample 3 had a similar molecular weight to Sample 8, but the lower Tg sample (Sample 8), had much better completion percentage.

Because the completion percentage uses percent Tg as the input for build plate temperature, the completion percentage already takes into account the material's $T_g$ as it is the sum of the completion of the specimen at build plate temperature varied from 70% to 110% of the material's $T_g$. Surprisingly, despite being normalized for $T_g$, the completion percentage results show a strong dependence on the $T_g$ of the material. In other words, the lower Tg samples not only printed better at lower build plate temperature overall, but printed better even after accounting for the lower Tg, able to have a wider range of build plate temperatures that it can print on. Other classes of amorphous material to not demonstrate this strong of a dependence on $T_g$ to warping. This unexpected trend also likely explains the lack of commercial success of conventional higher $T_g$ acrylics in the filament marketplace.

The composition listed as Sample 11 featured a 10% loading of plasticizer added to the composition in Sample 5 to reduce its $T_g$ without adding additional copolymer. This sample also featured excellent performance in the completion percentage test, and fell in line with our result for the samples that had their $T_g$ modified through the addition of a copolymer.

Example 3

The aggregate completion percentage feature in Example 2 attempts to evaluate the warping characteristics of a material across its processing window. In current desktop 3D printers changes in ambient conditions may cause build plate temperatures to fluctuate and drafts or other unexpected airflow may cause unexpected cooling. As such, the materials that dominate the marketplace today, such as PLA and PETG, feature a wide processing window and can be printed at a variety of build plate temperatures without warping.

If current technological advances continue, these limitations may no longer be relevant to material selection in FFF 3D printing. Our current printer was practically limited to roughly 120° C. max build plate temperature, which is a limitation common amongst all but the most expensive 3D printers. Likewise our printer did not feature a heated chamber or enclosure, so the air temperature around the part was always the same as the temperature in the room.

Figures 3, 4:
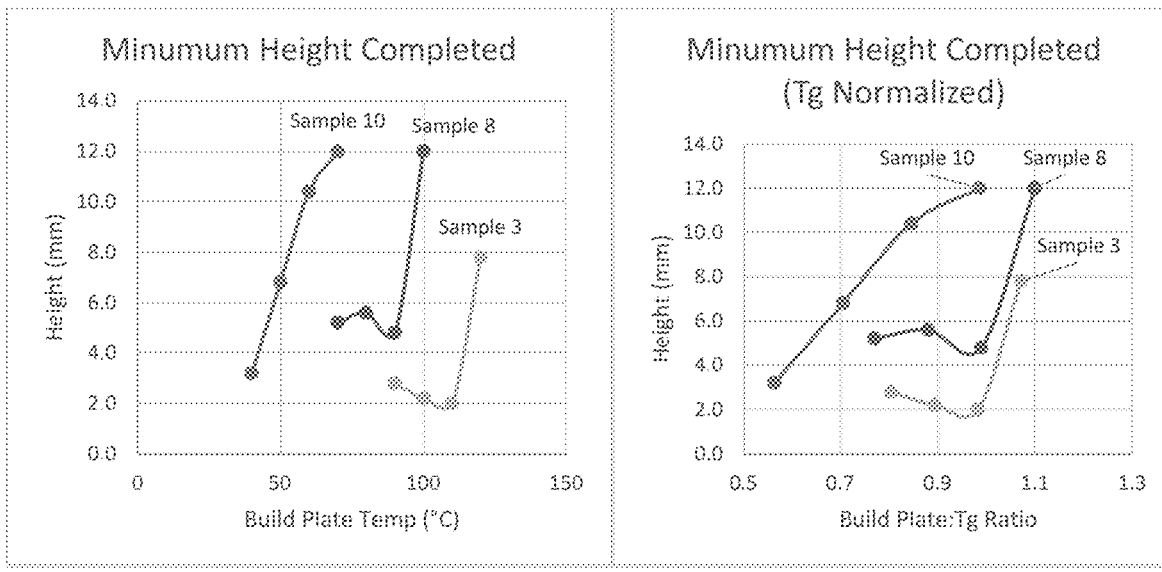
FIG. 3 and FIG. 4 show the individual data points used to generate the aggregate completion percentage of Example 3.

FIG. 3 and FIG. 4 show the individual data points used to generate the aggregate completion percentage. The aggregate completion percentage featured in Example 2 is the area under the curves featured in FIG. 3 as evaluated by trapezoidal rule from a ratio of 0.7 to a ratio of 1.1. Thus, the lower the temperature relative to its $T_g$ at which the material can still reach the full 12 mm height of the specimen, the larger the area beneath the curve and the higher aggregate completion percentage. Although the better performing materials all have curve that are shifted to the lower temperature end of the spectrum, it is worth noting that all of the materials maintain a positive correlation between build plate temperature and height completed. Given this positive correlation, we can propose that higher $T_g$ acrylic compositions would exhibit better completion percentages if printed with a build plate temperature greater than 110% of the material's glass transition temperature. Additional printer functionality such as a heated chamber or an additional radiative heating element would also allow the part to be heat soaked, and allow for the full completion of the warping specimen.

Example 4

Another variation made in the compositions feature in Table 2 was the composition of the impact modifier. Samples 6 and 7 had the same acrylic copolymer matrix, and both have 20-30% impact modifier, but used core-shell impact modifiers with different compositions. The following chemicals were used in all modifier emulsifications:

MMA=methyl methacrylate

EA=ethyl acrylate

BA=butyl acrylate

Sty=styrene

ALMA=allyl methacrylate

Sample 6 utilized the impact modifier composition described below:

A three-stage polymer of the composition made by the method of Owens (U.S. Pat. No. 3,793,402), initiated with potassium persulfate and stabilized with potassium dodecylbenzene sulfonate, where the ratio of the three stages was 35//45//20

Stage 1. MMA/EA/ALMA (95.8/4/0.2)

Stage 2. BA/Styrene/ALMA (80.2/17.8/2)

Stage 3. MMA/EA (96/4)

Sample 7 utilized the impact modifier described below:

1. multi-stage, sequentially produced polymer of composition.
2. The ratio of the three stages was 12//55//33
3. The composition of the three stages was Stage 1: 74.8/25/0.2 MMA/EA/ALMA Stage 2: 83.5/15.5/1.0 BA/Sty/ALMA Stage 3: 95/5 MMA/EA A monomer charge consisting of 34% of Stage 1 was emulsified in water using potassium dodecyl benzene sulfonate as the emulsifier and using potassium carbonate to control the pH was polymerized using potassium persulfate at elevated temperatures. The remaining portion of Stage 1 was then added to the preformed polymer emulsion and was polymerized using potassium persulfate at elevated temperatures controlling the amount of soap added to prevent the formation of a significant number of new particles. The Stage 2 monomers were then added and polymerized using potassium persulfate at elevated temperatures controlling the amount of soap added to prevent the formation of a significant number of new particles. The third stage monomers were then polymerized using potassium persulfate at elevated temperatures and again controlling the amount of soap added to prevent the formation of a significant number of new particles. The polymer was isolated by coagulation, freeze-drying, or spray-drying.

Figure 5:
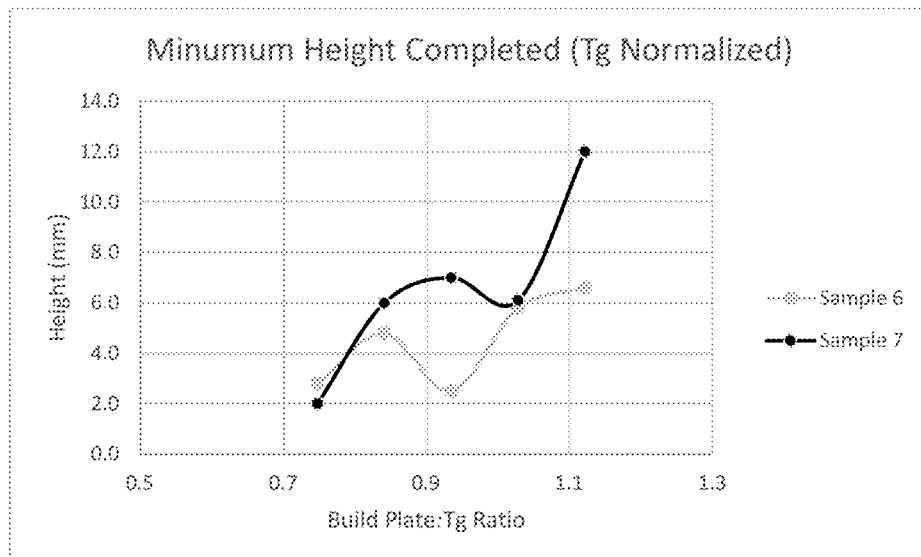
FIG. 5 and FIG. 6 show the individual data points used to generate the aggregate completion percentage of Example 4.
Figure 6:
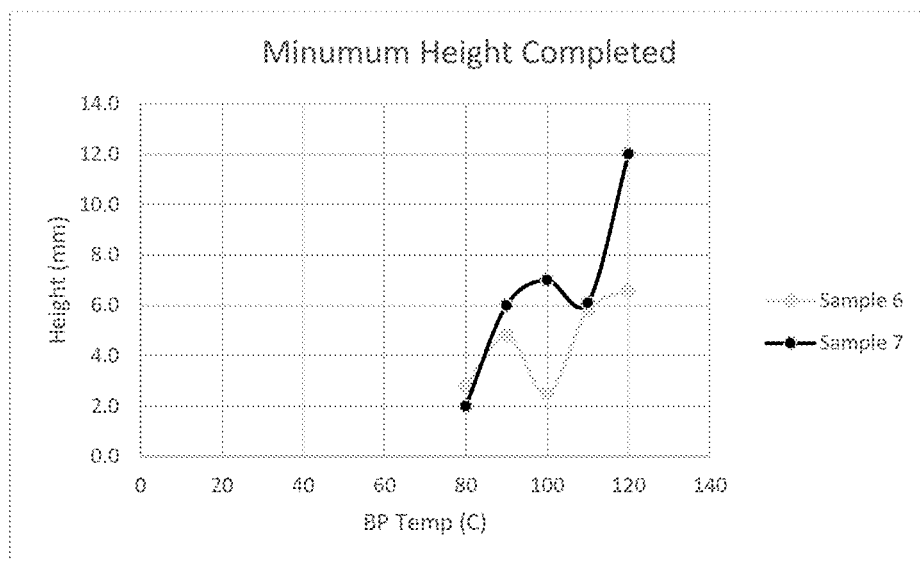

The impact modifiers that were incorporated in the acrylic copolymer via melt processing did not have nearly as much impact on printing performance as $T_g$, but certain chemistries did perform better than others, with sample seven performing better than sample six. FIG. 5 and FIG. 6 show the individual data points used to generate the aggregate completion percentage.

Example 5

Internal Transparency Plaque Measurements

Figure 7:
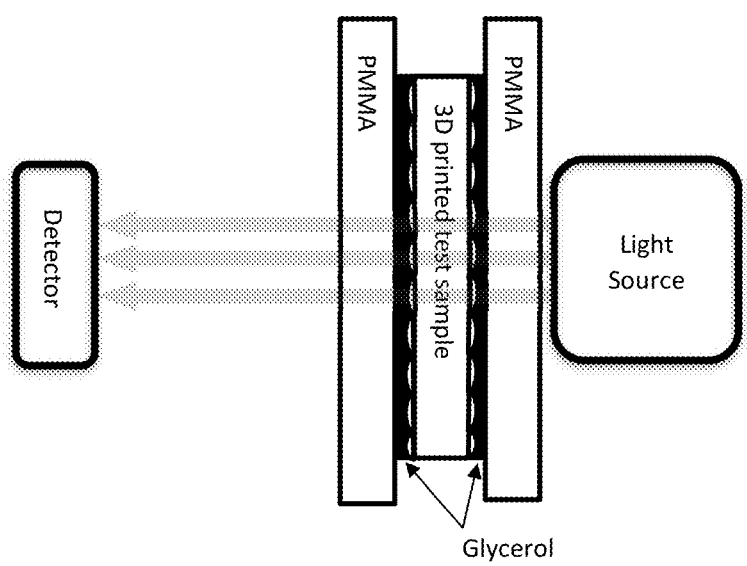
FIG. 7 is a schematic drawing of the internal transparency plaque measurement test.

Varieties of different plastic filaments were used to 3D print a 35 mm by 35 mm plaque that was 3.2 mm thick on an Ultimaker S5 3D printer. The transmission and haze for each of these plaques was measured using a BYK-Gardner Haze-Gard. The rough surface of the plaques causes the haze number to be very high, as the ridges scatter light. Rather than manually sanding and polishing the surfaces, a roughly index matched liquid was used to even out the surface. The 3D printed plaques were coated with glycerol (n≈21.45) and then pressed against an acrylic plate and measured. The plaques were measured without glycerol, with glycerol on one side, and with glycerol on both sides. A schematic of our tests can be seen in FIG. 7 below. These results are listed in Table 3.

The 15-30% ethyl acrylate modified copolymer was able to get the highest transmission and the lowest haze of the materials measured at 3.5%. Without the modified copolymer to lower the Tg and modify the rheology the standard PMMA was only able to achieve 14% haze under the most ideal conditions. The printer used was limited in the build plate temperatures that could be achieved, which prevented the internal part temperature from reaching the required delta of 10° C., 20° C., 30° C. above its L-S transition point to have the mobility required to allow the layer interfaces to fully disappear. While not being bound by any particular theory, it is believed that had the build plate been set hot enough to allow the internal temperature to reach ~160 C, an impact modified PMMA could be able to achieve less than 10% and even less than/5% haze.

TABLE 3

| Material | Tg (C) | Nozzle Temp (° C.) | Build plate Temp (° C.) | Layer Height (mm) | As printed (front) Transmission | Haze | 2 acrylic Plates + Glycerol Transmission | Haze |
|---|---|---|---|---|---|---|---|---|
| A. High EA impact modified copolymer | 70-75 | 235 | 75 | 0.05 | 89.7 | 61.8 | 89.6 | 3.5 |
| B. Low EA impact modified copolymer | 105-110 | 250 | 115 | 0.05 | 82.9 | 78.7 | 88.7 | 14.0 |
| C. PETG | 78-83 | 235 | 75 | 0.05 | 74.0 | 85.6 | 73.8 | 66.3 |
| D. Amphora HT | 100-105 | 265 | 115 | 0.05 | 88.5 | 67.5 | 89.2 | 10.3 |
| E. PMMA-PLA alloy | 80-90 | 235 | 75 | 0.05 | 82.0 | 50.8 | 81.6 | 14.6 |
| F. Commercial Copolyester | 76-81 | 235 | 75 | 0.05 | 80.5 | 75.7 | 82.6 | 19.6 |
| G. Injection Molded PMMA | 110-115 | N/A | N/A | N/A | 93.7 | 0.40 | 92.4 | 0.94 |

Example 6

IR Thermal Imaging of Part During Printing

Figure 8:
FIGS. 8 and 9 are thermal images of printed parts from Example 6 at the time of printing.

While using the outlined method to print transparent parts, a Flir E60 IR thermal camera recorded images of the printing process. These images established that the internal part temperature can be held well above the Tg of the material, but the material is still able to maintain its shape. The thermal image shown in FIG. 8 shows a part that measures 110 mm×20 mm that is 3 mm tall at the time the image was taken. The build plate was at 120° C. and the nozzle was at 245° C. The temperature at the measurement point in the center of the screen is 137° C. The entire part maintains an internal temperature that is above 130° C., but the part is able to maintain its shape over the 5-hour long printing process after which the final part height is 20 mm.

Figure 9:
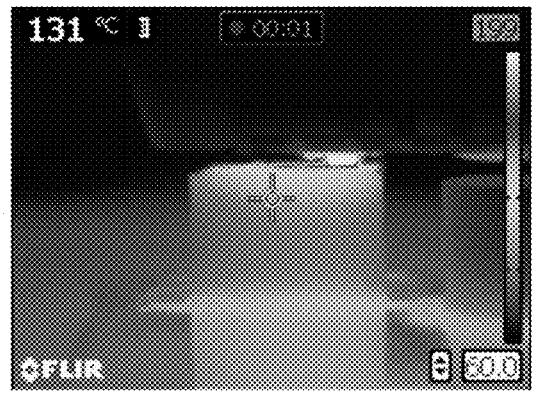
Figure 10:
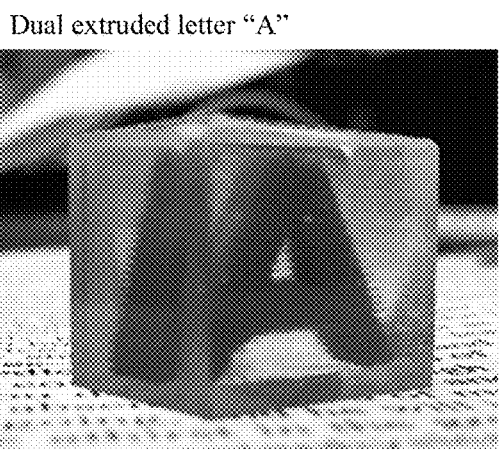
FIGS. 10 and 11 demonstrate the optical clarity of printed parts of Example 7

The second IR image shown in FIG. 9 shows a part that is 20 mm by 30 mm and 19 mm tall at the time of printing. The final part can be seen in FIGS. 10 and 11. The thermal image shows the heat soak at the top of the part. The higher build plate temperature and lack of cooling fan allow the recently printed layers to maintain their temperature and mobility for roughly 6 mm into the printed surface. At the given print speed, this represents roughly 20 minutes before a given layer cools below 130° C. The increased fluidity caused by the higher internal temperature allows the part to become internally transparent, yet the high first cross-over temp (190° C.) means the material is solidified enough to allow more complicated geometry to be resolved.

The above block was printed with two filaments. The transparent filament was the same composition mentioned in examples 1 and 2. An opaque, red ABS filament was used to make the internal "A" shape. These two filaments were extruded together by an Ultimaker S5. The object was printed with 0.3 mm layers. The layer ridges can be seen in the ABS letter but in the acrylic section, the layer interfaces have been eliminated through the process outlined above. The block is clear enough to read text through its 20 mm width. The block was finisher using an Edge Finisher Company Model EF-200 to create a flat and clear surface in a post-print surface finishing step.

The dual extruded block demonstrates that plastic can still be placed deliberately and precisely using this method despite the internal part temperatures exceeding the materials Tg. Although the plastic remains fluid for an extended period, it is thick enough to hold its position and allows complex internal geometry to be resolved within the clear acrylic.

Example 8

Rheology of Materials

A general description of the developed rheological method consists of melting the resin between parallel plates with a narrow gap, between 1.8 mm and 0.5 mm. In presence of fillers, the gap must be at least 10 times larger than the larger filler particle in the resin. It is preferable to heat the sample at least 30-50° C. above the melting temperature, but much before decomposition temperature. The rheometer used in this invention is the MCR502 from Anton Paar. The software is programmed to shear the sample by imposing a small oscillatory force while simultaneously decreasing the temperature at a constant cooling rates (between 5 C/min and 10 C/min are suggested). The test should be always run within the linear viscoelastic region which can be determined by running a strain amplitude sweep for each resin prior to the temperature sweep experiment.

The rheology of a high EA content, low Tg acrylic and a low EA, high Tg acrylic are shown below. From the viscosity curves, the liquid to solid transition temperature can be obtained. From the modulus, the first cross-over temperature where a part starts exhibiting some stiffening behavior (where G'>G") has be obtained.

Figure 11:
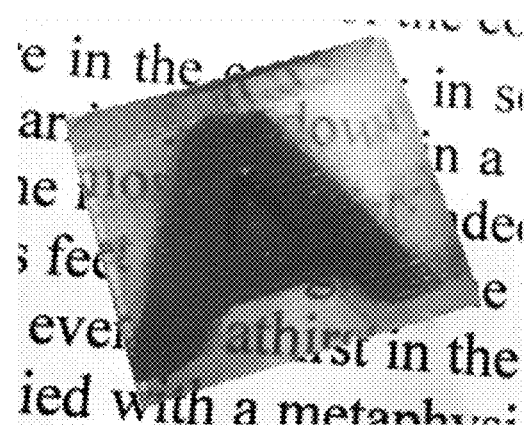

Generally speaking, the dynamic moduli are a measure of the viscoelastic properties of the material, being the storage modulus G', i.e. the elastic response, and the loss modulus G", i.e. the viscous response of the polymer. The crossover temperature (G'=G") can be taken as the onset of stiffening because the elastic modulus at lower temperature is dominating the viscous response. The results are shown in FIGS. 12 to 17 for Samples A, B, and C of Example 5. FIGS. 11 and 12 show rheology curves of Sample B—Med Tg PMMA with impact modifier, where Tg of the material is 105-110° C., L-S transition based of viscosity is 135° C., and the first cross-over temperature is 210° C. This material has a transparency processing range of about 85° C. FIGS. 13 and 14 show rheology curves of Sample A—Low Tg Acrylic with impact modifier composition where Tg of the material is 70-80 C, L-S transition based of viscosity is 100° C., and the first cross-over temp is 192° C. Thus this material has a transparency processing range (difference of L-S transition and first cross-over temp) of about 90° C. FIGS. 16 and 17 show rheology curves for PETG—Sample C.

What is claimed is:

1. An acrylic polymer composition for use in 3-D printing, wherein said acrylic polymer composition comprises a single matrix acrylic copolymer alloyed with less than 5% other non-acrylic compatible, miscible or semi-miscible polymers, and optionally one or more additives dispersed within said matrix, wherein the acrylic polymer composition has a Tg of less than 160° C.

2. The acrylic polymer composition of claim 1, wherein said matrix acrylic copolymer comprises methyl methacrylate monomer units and from 0.1 to 60 weight percent of one or more other monomers that are copolymerizable with said methylmethacrylate methyl methacrylate monomer units.

3. The acrylic polymer composition of claim 1, wherein said matrix acrylic copolymer comprises at least 90 weight percent of (meth) acrylic monomer units, based on a total number of monomer units in the copolymer.

4. The acrylic polymer composition of claim 1, wherein said matrix acrylic copolymer has a weight average molecular weight of from 50,000 to 500,000.

5. The acrylic polymer composition of claim 1, wherein said matrix acrylic composition has a viscosity at a shear of 1 sec-1 of less than 100,000 Pa-sec at a temperature of 230° C., and a viscosity of 20 to 2,000 Pa-s at a shear rate of 100 sec-1 at a temperature of 230° C., as measured by a rotational viscometer according to ASTM C965, wherein said viscosity measurement is on the polymer composition without impact modifier.

6. The acrylic polymer composition of claim 2, wherein said matrix acrylic copolymer comprises at least one other acrylic monomer unit selected from the group consisting of methyl acrylate, ethyl acrylate and ethyl methacrylate, butyl acrylate and butyl methacrylate, iso-octyl methacrylate and acrylate, n-octyl acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, isodecyl acrylate and methacrylate, tertiobutyl cyclohexyl acrylate and methacrylate, tertiobutyl cyclohexanol methacrylate, trimethyl cyclohexyl acrylate and methacrylate, methoxy polyethylene glycol methacrylate and acrylate with 2-11 ethylene glycol units, penoxyethyl acrylate and methacrylate, alkoxylated phenol acrylate, ethoxylated phenyl acrylate and methacrylate, epoxypropyl methacrylate, tetrahydrofurfuryl acrylate and methacrylate, alkoxylated tetrahydrofurfuryl acrylate, cyclic trimethylolpropane formal acrylate, carprolactone acrylate, dimethylamino ethyl acrylate, methacrylate monomers and mixtures thereof.

7. The acrylic polymer composition of claim 1, wherein said acrylic polymer composition further comprises an impact modifier that is a core-shell impact modifier or block copolymer.

8. The acrylic polymer composition of claim 7, wherein said impact modifier is refractive index matched to the acrylic polymer composition.

9. The acrylic polymer composition of claim 7, wherein said core-shell impact modifier comprises:
   a) a first stage which is optionally non-elastomeric and has a glass transition temperature of greater than 25° C., and which is polymerized from a monomer mixture of 100-80 weight percent of methyl methacrylate monomer units, 0 to 10 weight percent of a copolymerizable polyfunctional crosslinking monomer, and 0 to 10 weight percent of a copolymerizable graftlinking monomer having two or more addition polymerizable unsaturated reactive groups which participate in a polymerization reaction at different rates;
   b) an intermediate stage which is elastomeric and which is polymerized when present with the first stage, from a monomer mixture comprising 50 to 99.9 weight percent of an alkyl acrylate and/or alkyl methacrylate mixtures thereof wherein alkyl groups contain 1 to 8 carbon atoms, 0 to 49.9 weight percent of a copolymerizable monoethylenically unsaturated monomer, 0 to 5.0 weight percent of a copolymerizable polyfunctional crosslinking monomer, and 0.05 to 5.0 weight percent of a copolymerizable graftlinking monomer as described above, said intermediate stage further characterized in that it would exhibit a glass transition temperature of 25° C. or less if the monomer mixture were polymerized without the first stage; and at least one final stage which is polymerized when present with the first and intermediate stages from a monomer mixture of the monomers described above for the rigid thermoplastic polymer, the final stage further characterized in that it would exhibit a glass transition temperature of greater than 50° C. if the monomers were polymerized without the first and intermediate stages, the graft linking monomer having two or more addition polymerizable unsaturated reactive groups which participate in the polymerization reaction at different rates and the cross-linking monomer having a plurality of addition polymerizable unsaturated groups all of which participate in the polymerization reaction at a same rate as one another.

10. The acrylic polymer composition of claim 1, further comprising one or more additives, selected from the group consisting of fillers, carbon fiber, milled carbon fiber, carbon powder, carbon nanotubes, boron nitride, diamond, glass beads, glass fibers, titanium dioxide, zinc oxide, PdS, barium sulfate ($BaSO_4$), silicon dioxide, nano-silica ($SiO_2$), calcium carbonate ($CaCO_3$), natural and synthetic clay systems, aluminosilicates, montmorillonite, aramid fiber, polyaryl ether ketone fibers, graphite, graphite nano-platelets, graphite oxide, graphene, milled carbon fibers, nano-fibers, hollow spheres, dyes, colorants, pigment, metallic particles, metallic flakes, opalescent dyes, fluorescent dyes, polymeric particles that may be crosslinked and are comprised of polymers selected from acrylic polymers and copolymers, cross-linked acrylic beads having an average particle size of from 20 to 500 micrometers, styrene-based particles, copolymers comprising greater than 50 percent by weight styrene monomer units, silicones, polyamides, fluoropolymers, poly (tetrafluoroethylene), poly (vinylidene fluoride), and vinylidene fluoride/hexafluoropropylene copolymers, de-odorizers, fragrances, internal release agents, emissivity agents, diffusing particles, reflective particles, optical brighteners, flame retardants, UV stabilizers, anti-microbial additives, cellulose, anti-oxidants and mixtures thereof.

11. The acrylic polymer composition of claim 1, wherein said composition is in the form of a powder, pellets, or filament.

12. An acrylic article made by a material extrusion additive manufacturing process, using the acrylic polymer composition of claim 1.

13. The article of claim 12, wherein said article has one or more of the following properties:
   a) a tensile elongation as measured by ASTM D638 of greater than 10 percent,
   b) an internal fill density of greater than 90 percent,
   c) a stress at yield of greater than 35 MPa when measured by ASTM D638.

14. An acrylic article, wherein said article is clear, wherein said article comprises an acrylic polymer composition comprising a single matrix acrylic copolymer alloyed with less than 5% other non-acrylic compatible, miscible or semi-miscible polymers and having a Tg of less than 160° C., wherein a 3-D printed part of 2 mm thickness, has a total white light transmittance of greater than 80%, and a haze of less than 80%, as measured according to ASTM D1003, and wherein a 3-D printed part of 2 mm thickness, printed at a line height of 0.1 mm or more has an internal haze of less than 25%.

15. The acrylic article of claim 14, wherein said acrylic polymer composition comprises a single matrix acrylic copolymer optionally alloyed with less than 5% other compatible, miscible or semi-miscible polymers, and optionally one or more additives dispersed within said matrix.

16. A process for forming an extrusion additive (3D) acrylic article, comprising the steps of:

presetting software of a 3D printer to a set volume flow and line spacing for printing of said article;
optionally using a heated build plate;
feeding the acrylic polymer composition of claim 1 in a form of filament, pellets or powder into the 3D printer;
feeding by the printer of the acrylic polymer composition to a heated nozzle; and
depositing the acrylic composition melt at a set location, line spacing and flow rate set by the software, to form an article.

17. The process of claim 16, wherein the acrylic polymer composition as a whole has a Tg between 70° C. and 160° C. and where a build plate temperature during the process is maintained at least 1% above the acrylic composition's Tg as measured in C.

18. The process of claim 16, wherein the flow rate and/or line spacing represents an overflow of from 1-10 percent.

19. A 3-D printed article, comprising an acrylic composition comprising a single matrix acrylic copolymer alloyed with less than 5% other non-acrylic compatible, miscible or semi-miscible polymers and having a Tg of less than 110° C.

20. The article of claim 19, wherein said article is selected from the group consisting of a transportation article, a lighting article, a building and construction article, a medical article, a sanitary article, designer kitchenware, medical, and an electronic article.

21. The article of claim 19, wherein said article is configured for use in applications selected from the group consisting of exterior paneling, automotive body panels, auto body trim, recreational vehicle body panels or trims, exterior panels for recreational sporting equipment, marine equipment, exterior panels for outdoor lawn, garden and agricultural equipment and exterior paneling for marine, aerospace structures, aircraft, public transportation applications, interior paneling applications, interior automotive trims, components for head and or tail lights on vehicles, lenses, prototyping, display panels, interior panels for marine equipment, interior panels for aerospace and aircraft, interior panels for public transportation applications, and paneling for appliances, furniture, and cabinets, recreational vehicle, sporting equipment, marine, aerospace, decking, railing, siding, window and door profiles, dishwasher and dryers, refrigerator and freezers, appliance housing or doors, bathtubs, shower stalls, spas, counters, and storage facilities, decorative exterior trim, molding side trim, quarter panel trim panels, fender and fender extensions, louvers, rear end panels, caps for pickup truck back, rearview mirror housings, accessories for trucks, buses, campers, vans, and mass transit vehicles, b pillar extensions; appliances and tools, lawn and garden implements, bathroom fixtures for mobile homes, fencing, components of pleasure boats, exterior components of mobile homes, lawn furniture, chair and table frames, pipe and pipe end caps, luggage, shower stalls for mobile homes, toilet seats, signs, spas, air conditioner and heat pump components, kitchen housewares, bead molded picnic coolers, picnic trays and jugs, and trash cans; venetian blind components; sporting goods, sailboards, sailboats; plumbing parts, lavatory parts; construction components, architectural moldings, door molding, louvers, and shutters, mobile home skirting, residential or commercial doors, siding accessories, window cladding, storm window frames, skylight frames, end caps for gutters, awnings, car port roofs, lamp, lighting equipment, sensor, custom carry cash for consumer items, silverware, trim for cars, prototypes, figurines, dentures, hardware, cabinet, ball-joint, hosing, glasses, cage, UV protector screen, window, signage, toys, medical equipment, implants and equipment components, lighting appliques, luminaires, window coverings, surface modification, visualization aids 3D model based on, medical imaging, architectural models, topographic data, mathematical analysis, or other data sets, education aids, props, costumes, park benches, robotics components, electrical enclosures, 3D printer components, jigs, fixtures, manufacturing aids, molds, sculptures, statues, board games, miniatures, dioramas, trophies, drones, UAV's, medical devices (Class I, Class II, and Class III according to FDA Code of Federal regulations Title 21), light guides, internal lighting, integrated optical components, display components, instrumentation, see through components, solar cells, fixtures and rigging for solar power generating systems, artificial nails, dosimeters, jewelry, footwear, fabric, firearm components, cell phone cases, and packaging.

\* \* \* \* \*